(12) United States Patent
Ishikawa et al.

(10) Patent No.: US 9,324,148 B2
(45) Date of Patent: Apr. 26, 2016

(54) IMAGE PROCESSING APPARATUS, IMAGE PROCESSING METHOD AND PROGRAM

(71) Applicants: CANON KABUSHIKI KAISHA, Tokyo (JP); THE UNIVERSITY OF TOKYO, Tokyo (JP)

(72) Inventors: Ryo Ishikawa, Kawasaki (JP); Kiyohide Satoh, Kawasaki (JP); Katsushi Ikeuchi, Tokyo (JP); Bo Zheng, Tokyo (JP); Yonggi Sun, Tokyo (JP)

(73) Assignee: Canon Kabushiki Kaisha and The University of Tokyo, Tokyo (JP)

( * ) Notice: Subject to any disclaimer, the term of this patent is extended or adjusted under 35 U.S.C. 154(b) by 0 days.

(21) Appl. No.: 14/344,670

(22) PCT Filed: Sep. 26, 2012

(86) PCT No.: PCT/JP2012/075577
§ 371 (c)(1),
(2) Date: Mar. 13, 2014

(87) PCT Pub. No.: WO2013/047882
PCT Pub. Date: Apr. 4, 2013

(65) Prior Publication Data
US 2014/0348432 A1    Nov. 27, 2014

(30) Foreign Application Priority Data
Sep. 28, 2011    (JP) .................. 2011-213381

(51) Int. Cl.
*G06T 7/00* (2006.01)
*G06K 9/46* (2006.01)

(52) U.S. Cl.
CPC ............ *G06T 7/0028* (2013.01); *G06K 9/4604* (2013.01); *G06T 7/0012* (2013.01);
(Continued)

(58) Field of Classification Search
None
See application file for complete search history.

(56) References Cited

U.S. PATENT DOCUMENTS 6,993,450 B2    1/2006    Takemoto et al.
7,092,109 B2    8/2006    Satoh et al.
(Continued)

FOREIGN PATENT DOCUMENTS

JP    2005-080757 A    3/2005
JP    2009-273597 A    11/2009
WO    2009/131209 A    10/2009

OTHER PUBLICATIONS

Zheng et al, "An Adaptive and Stable Method for Fitting Implicit Polynomial Curves and Surfaces," 2009, IEEE Transactions on Pattern Analysis and Machine Intelligence, vol. 32, pp. 1-8.*
(Continued)

*Primary Examiner* — David F Dunphy
(74) *Attorney, Agent, or Firm* — Fitzpatrick, Cella, Harper & Scinto

(57) ABSTRACT

There is provided an image processing apparatus which calculates a feature value of an image. The apparatus comprises first obtaining means for obtaining an image; calculation means for calculating a set of numerical values formed from degrees of contributions of each of a plurality of order, wherein the degree of contributions of each order indicate contributions of monomials of the order for intensity values which are calculated using an approximation polynomial, and wherein the approximation polynomial provides a relationship between a pixel position of the image and an intensity value at the pixel position and is formed from a plurality of the monomials each having an order out of the plurality of orders; and first output means for outputting the set of the calculated numerical values as the feature value of the image.

17 Claims, 11 Drawing Sheets

(52) U.S. Cl.
CPC .......... *G06T2207/10081* (2013.01); *G06T 2207/10088* (2013.01); *G06T 2207/10136* (2013.01); *G06T 2207/20021* (2013.01); *G06T 2207/30004* (2013.01)

(56) References Cited

U.S. PATENT DOCUMENTS

| | | |
|---|---|---|
| 7,130,754 B2 | 10/2006 | Satoh et al. |
| 7,848,903 B2 | 12/2010 | Aratani et al. |
| 8,345,927 B2 | 1/2013 | Ishikawa et al. |
| 2005/0053270 A1 | 3/2005 | Kasai et al. |
| 2006/0098893 A1* | 5/2006 | Kondo et al. ............ 382/266 |
| 2007/0003165 A1* | 1/2007 | Sibiryakov et al. ....... 382/294 |
| 2011/0019921 A1 | 1/2011 | Hamada |

OTHER PUBLICATIONS

Cheung, W. et al., "n-SIFT: n-Dimensional Scale Invariant Feature Transform", IEEE Transactions on Image Processing, vol. 18, No. 9, Sep. 2009.

International Search Report and Written Opinion in International Application No. PCT/JP2012/075577 mailed Dec. 11, 2012.

* cited by examiner

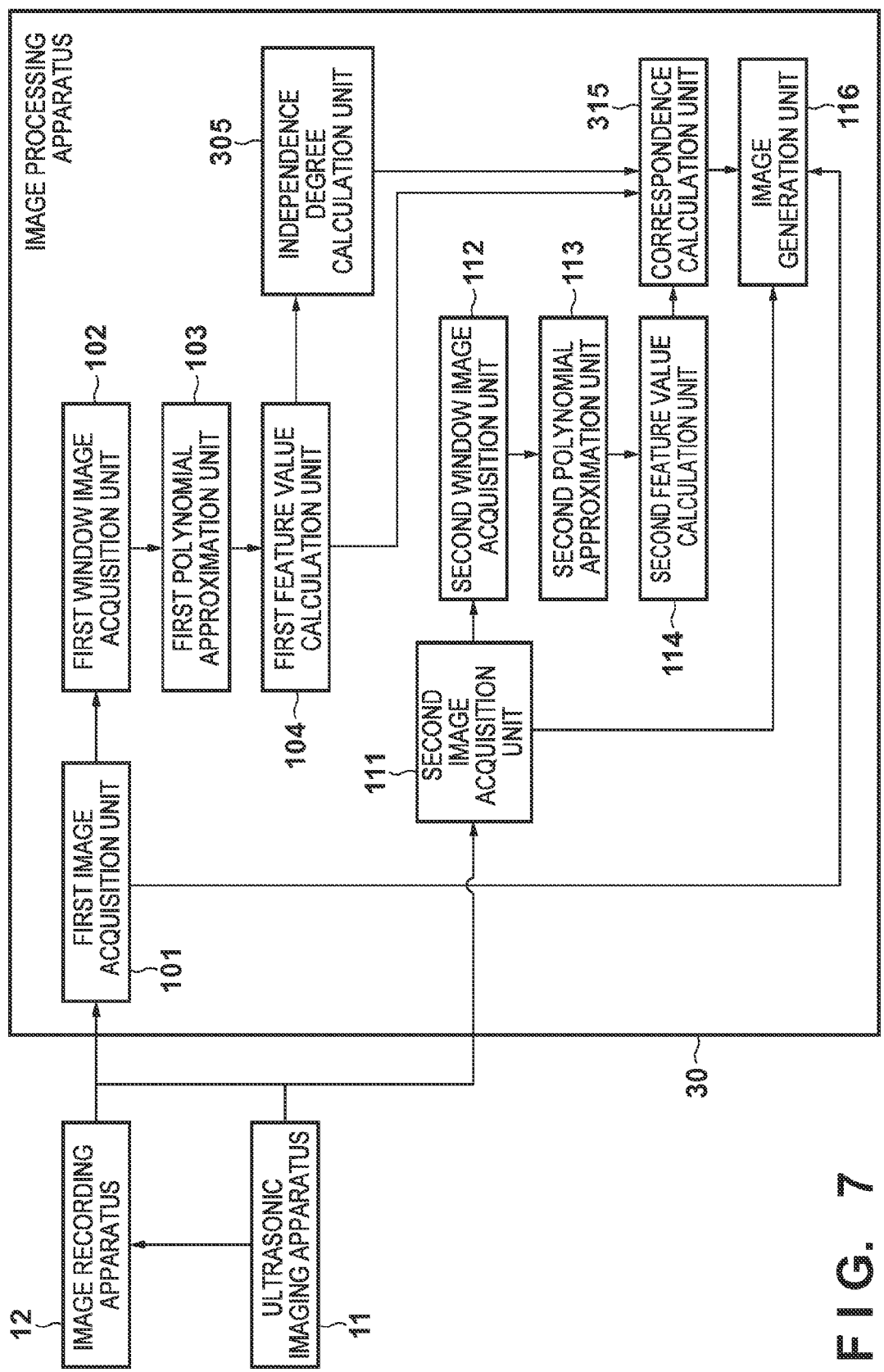
F I G. 7

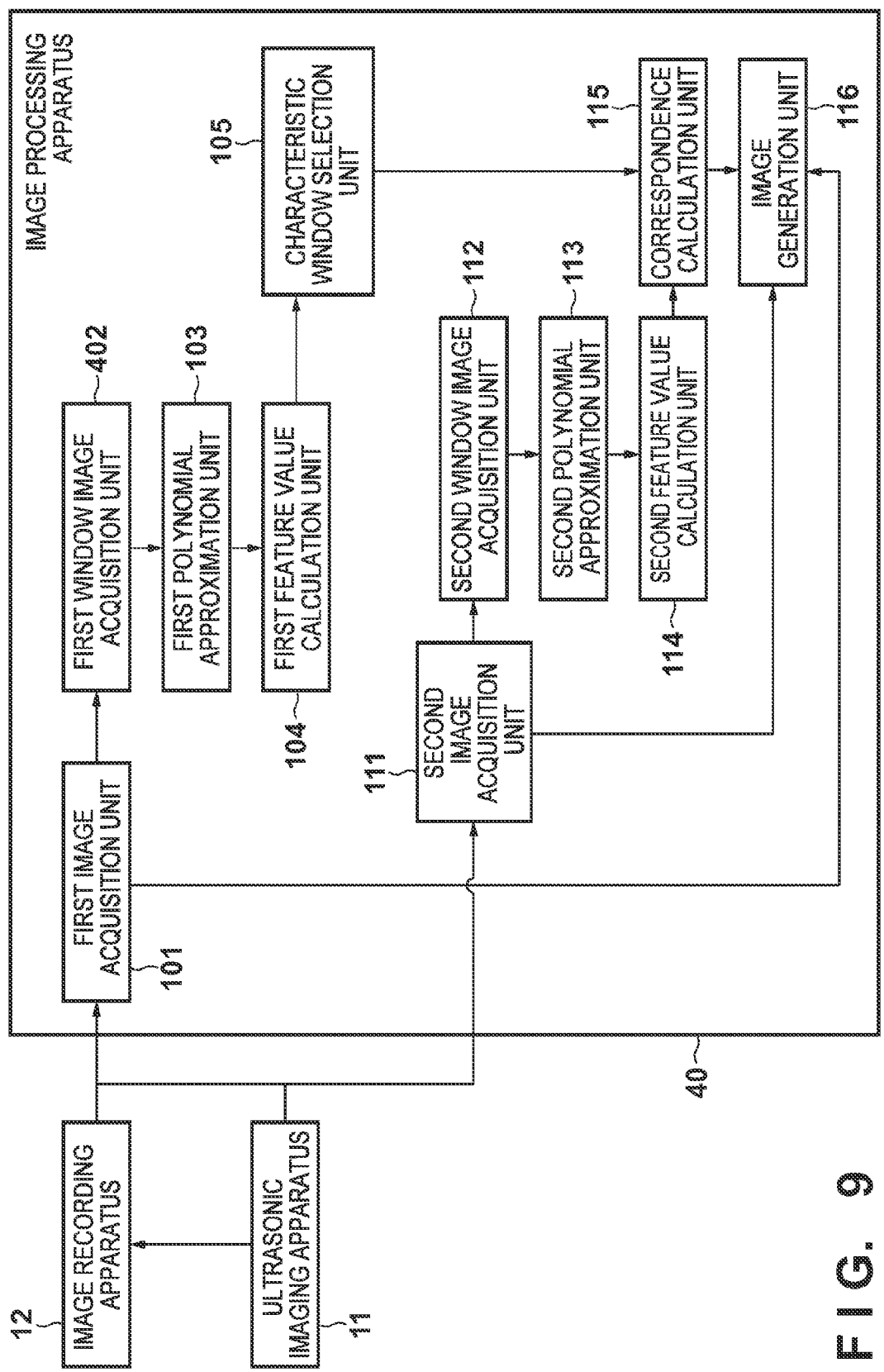
F I G. 9

FIG. 11A    FIG. 11B    FIG. 11C
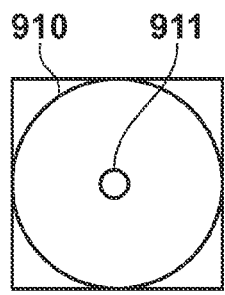 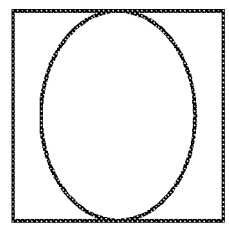 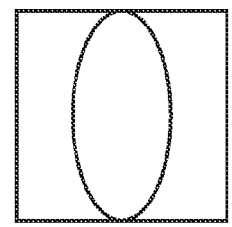
FIG. 11D    FIG. 11E    FIG. 11F
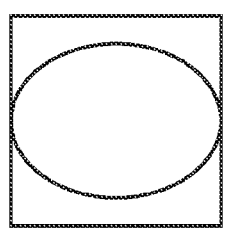 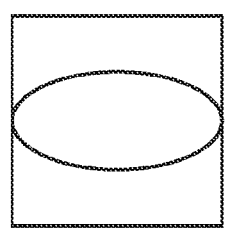 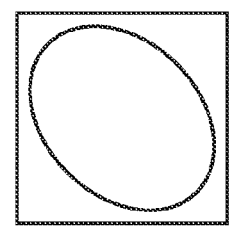
FIG. 11G    FIG. 11H    FIG. 11I
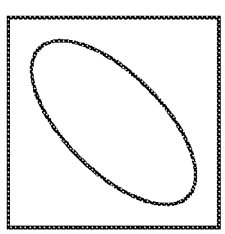 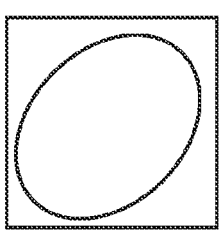 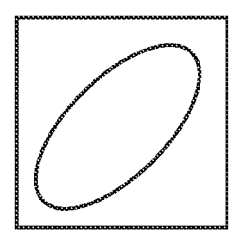

IMAGE PROCESSING APPARATUS, IMAGE PROCESSING METHOD AND PROGRAM

TECHNICAL FIELD

The present invention relates to an image processing technique for calculating the feature value of an image.

BACKGROUND ART

In the medical field, a doctor observes the position, state, temporal change, and the like of a morbid portion by interpreting a medical image obtained by imaging a patient using a medical image collection apparatus. Apparatuses for generating a medical image include a plain X-ray imaging apparatus, X-ray computed tomography apparatus (X-ray CT), magnetic resonance imaging apparatus (MRI), and ultrasonic image diagnostic apparatus (US). These apparatuses have different characteristics, so the doctor generally selects a plurality of apparatuses suited to a region to be imaged: a disease, or the like. For example, the MRI image of a patient is captured, and an ultrasonic image is captured while referring to the MRI image, thereby obtaining information effective for diagnosis, including the position and spread of a morbid portion.

When various apparatuses capture medical images at various times, diagnosis using these images can be made more easy by making these images correspond to each other. As one method for making images correspond to each other, a technique for making multi-dimensional images correspond to each other is disclosed in Warren Cheung and Ghassan Hamarneh, "n-SIFT: n-Dimensional Scale Invariant Feature Transform", IEEE Transaction on Image Processing, Vol. 18, No. 9, September 2009 (NPL 1). In this technique, an intensity gradient histogram in a local area of a multi-dimensional image is calculated as the feature value of an image in the local area. By comparing this feature value with a feature value similarly obtained for another image, images can be made to correspond to each other. Corresponding portions in medical images captured by various imaging apparatuses can be observed in correspondence with each other.

SUMMARY OF INVENTION

The technique described in NPL 1 calculates a high-dimensional feature value. Hence, this technique requires a large calculation amount in feature value calculation processing and correspondence processing using a feature value. Especially when images are made to correspond to each other in real time, the processing load needs to be reduced. In addition, the technique described in NPL 1 decreases the correspondence accuracy under the influence of rotation between images and image noise.

The present invention provides a technique for calculating a feature value available for making images correspond to each other more quickly.

According to one aspect of the present invention, an image processing apparatus which calculates a feature value of an image comprises: first obtaining means for obtaining an image; calculation means for calculating a set of numerical values formed from degrees of contributions of each of a plurality of order, wherein the degree of contributions of each order indicate contributions of monomials of the order for intensity values which are calculated using an approximation polynomial, and wherein the approximation polynomial provides a relationship between a pixel position of the image and an intensity value at the pixel position and is formed from a plurality of the monomials each having an order out of the plurality of orders; and first output means for outputting the set of the calculated numerical values as the feature value of the image.

According to another aspect of the present invention, an image processing apparatus which calculates a feature value of an image comprises: first obtaining means for obtaining an image; calculation means including: acquisition means for acquiring orthogonal vectors corresponding to respective monomials for an approximation polynomial, wherein the approximation polynomial is formed from a plurality of monomials each having an order out of a plurality of orders and wherein the approximation polynomial provides a pixel value at a pixel position of the image as a function of the pixel position; first calculation means for calculating feature values corresponding to the respective monomials by multiplication of a matrix having the orthogonal vectors as elements and a matrix having pixel values in the image as elements; and second calculation means for calculating a feature value corresponding to an order of interest from the feature value corresponding to at least one monomial having the order of interest; and first output means for outputting a set of the feature values corresponding to the respective orders as the feature value of the image.

According to still another aspect of the present invention, an image processing apparatus which calculates a feature value of an image comprises: first obtaining means for obtaining an image; calculation means including: acquisition means for acquiring, for an approximation polynomial, first information representing values of respective elements of a first matrix which has orthogonal vectors corresponding to respective monomials as elements and second information which represents values of respective elements of a second matrix, wherein the approximation polynomial is formed from a plurality of monomials each having an order out of a plurality of orders and provides a pixel value at a pixel position of the image as a function of the pixel position, and wherein multiplication of the first matrix and the second matrix provides a matrix having products of coordinate values of pixel positions in the image as elements; first calculation means for calculating coefficients of the respective monomials from the first matrix, the second matrix, and a matrix having pixel values at the respective pixel positions in the image as elements, and calculating feature values corresponding to the respective monomials by multiplication of the second matrix and a matrix having the coefficients of the respective monomials as elements; and second calculation means for calculating a feature value corresponding to an order of interest from the feature value corresponding to at least one monomial having the order of interest; and first output means for outputting a set of the feature values corresponding to the respective orders as the feature value of the image.

According to yet another aspect of the present invention, an image processing apparatus which calculates a feature value of an image comprises: first obtaining unit configured to obtain an image; calculation unit configured to calculate a set of numerical values formed from degrees of contributions of each of a plurality of order, wherein the degree of contributions of each order indicate contributions of monomials of the order for intensity values which are calculated using an approximation polynomial, and wherein the approximation polynomial provides a relationship between a pixel position of the image and an intensity value at the pixel position and is formed from a plurality of the monomials each having an order out of the plurality of orders; and first output unit configured to output the set of the calculated numerical values as the feature value of the image.

According to still yet another aspect of the present invention, an image processing method for calculating a feature value of an image comprises the steps of: obtaining an image; calculating a set of numerical values formed from degrees of contributions of each of a plurality of order, wherein the degree of contributions of each order indicate contributions of monomials of the order for intensity values which are calculated using an approximation polynomial, and wherein the approximation polynomial provides a relationship between a pixel position of the image and an intensity value at the pixel position and is formed from a plurality of the monomials each having an order out of the plurality of orders; and first output means for outputting the set of the calculated numerical values as the feature value of the image.

According to an embodiment of the present invention, a feature value available for making images correspond to each other can be calculated more quickly.

Further features of the present invention will become apparent from the following description of exemplary embodiments with reference to the attached drawings.

BRIEF DESCRIPTION OF DRAWINGS

FIG. 7 is a block diagram showing the functional arrangement of an image processing system according to the third embodiment;

FIG. 9 is a block diagram showing the functional arrangement of an image processing system according to the fourth embodiment;

FIGS. 11A to 11I are views each exemplifying a window area according to the fourth embodiment.

DESCRIPTION OF EMBODIMENTS

Embodiments of an image processing apparatus and method according to the present invention will now be described in detail with reference to the accompanying drawings. However, the scope of the present invention is not limited to the following examples.

[First Embodiment]

An image processing apparatus 10 according to the first embodiment will be described. A first polynomial approximation unit 103 and first feature value calculation unit 104 according to the first embodiment can calculate the feature value of an image serving as a processing target. By using calculated feature values, images can be made to correspond to each other, similar to a method to be performed by a correspondence calculation unit 115. A feature value to be calculated in the embodiment is invariant regardless of rotation of an image. Even when images rotate, they can be associated with each other at higher accuracy.

In the embodiment, the image processing apparatus 10 aligns images using a feature value calculated by the first polynomial approximation unit 103 and first feature value calculation unit 104. However, the present invention is not limited to the technique for aligning images. For example, processes to be performed by respective units other than the first polynomial approximation unit 103 and first feature value calculation unit 104 may be executed by an apparatus other than the image processing apparatus 10. Instead of aligning images, the image processing apparatus 10 can extract a pair of similar images from a plurality of images by using calculated feature values.

The image processing apparatus 10 according to the first embodiment acquires and aligns the first and second images. For example, the first and second images can be two three-dimensional images of almost the same region of the same subject. An outline of processing to be performed by the image processing apparatus according to the embodiment will be explained. First, the image processing apparatus 10 calculates the feature values of a plurality of subregions (windows) in the first image. Then, the image processing apparatus 10 similarly calculates the feature values of a plurality of windows in the second image. Based on the calculated feature values, the image processing apparatus 10 makes a window in the first image correspond to a window in the second image. Based on the correspondence result, the image processing apparatus 10 executes alignment processing between the first and second images. Further, the image processing apparatus 10 can compare these two images to generate a display image to be observed.

Figure 1:
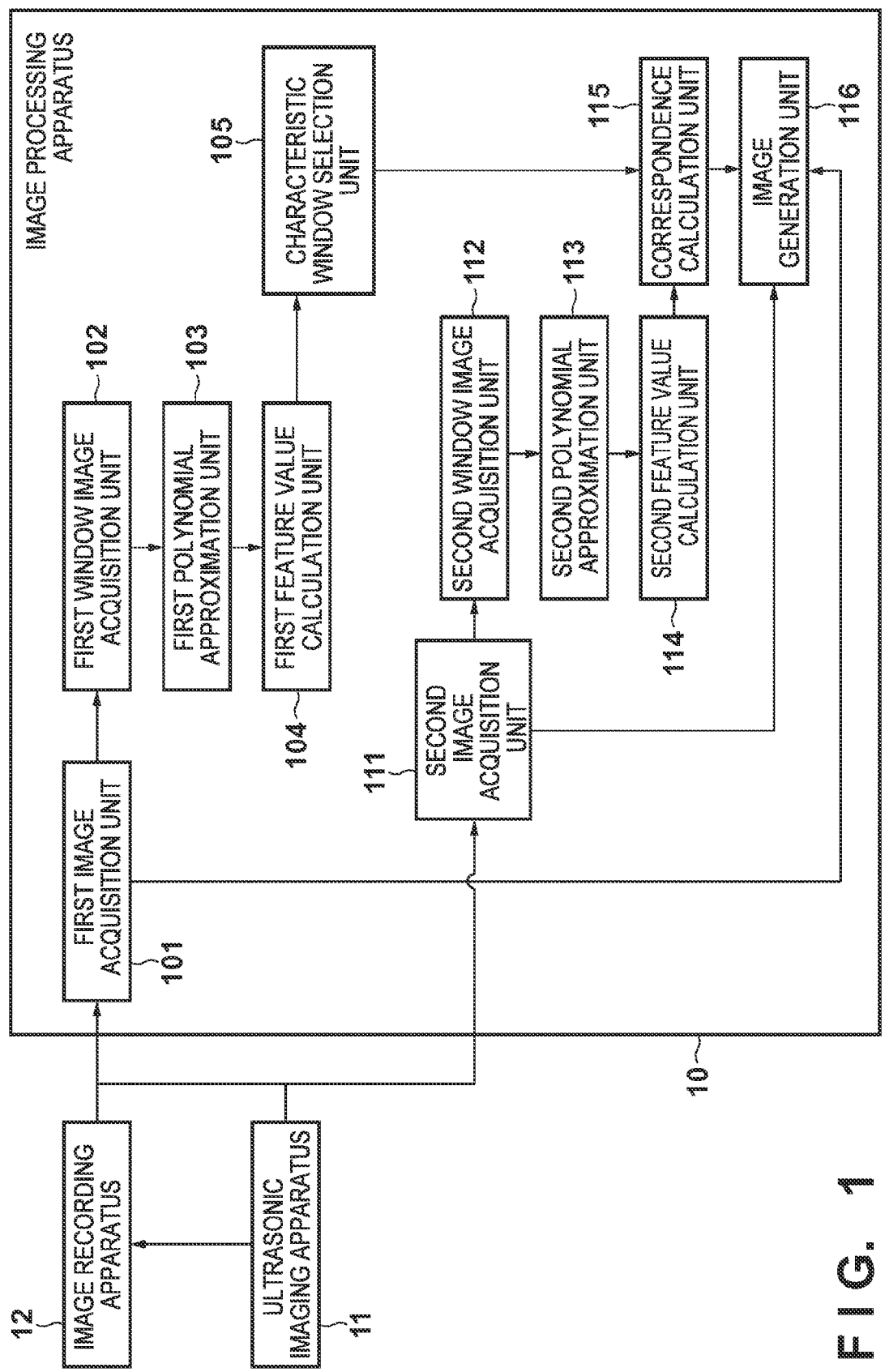
FIG. 1 is a block diagram showing the functional arrangement of an image processing system according to the first embodiment.

The arrangement of the image processing apparatus 10 according to the first embodiment will be described with reference to FIG. 1. The image processing apparatus 10 includes a first image acquisition unit 101, a first window image acquisition unit 102, the first polynomial approximation unit 103, the first feature value calculation unit 104, and a characteristic window selection unit 105. Further, the image processing apparatus 10 includes a second image acquisition unit 111, a second window image acquisition unit 112, a second polynomial approximation unit 113, a second feature value calculation unit 114, the correspondence calculation unit 115, and an image generation unit 116.

The first image acquisition unit 101 acquires the first image (second obtaining means). The first image acquisition unit 101 can acquire the first image from, for example, a storage apparatus such as an image recording apparatus 12. The first image acquisition unit 101 may acquire the first image from an image generation apparatus such as an imaging apparatus 11. The first image acquisition unit 101 outputs the acquired first image to the first window image acquisition unit 102 and image generation unit 116.

The first window image acquisition unit 102 generates the first window image group by cutting out a plurality of subregions from the first image acquired from the first image acquisition unit 101 (first setting means and first extraction means).

For each window image of the first window image group generated by the first window image acquisition unit 102, the first polynomial approximation unit 103 calculates a polynomial which approximates the window image. The first polynomial approximation unit 103 outputs information about the calculated polynomial to the first feature value calculation unit 104. Detailed contents of the information about the polynomial will be described later.

Based on the information about the polynomial acquired from the first polynomial approximation unit 103, the first feature value calculation unit 104 calculates the feature value of each window image (image) included in the first window image group (calculation means). The feature value calculation method will be described in detail later. The first feature value calculation unit 104 outputs the calculated feature value to the characteristic window selection unit 105.

Based on the feature value calculated by the first feature value calculation unit 104, the characteristic window selection unit 105 selects a characteristic window image from the first window image group. The characteristic window selection unit 105 outputs the selection result to the correspondence calculation unit 115.

In the embodiment, the first window image acquisition unit 102 generates a plurality of window images. The characteristic window selection unit 105 selects a window image suitable for alignment from the plurality of window images. However, the embodiment is not limited to this. For example, all the window images generated by the first window image acquisition unit 102 may be used as characteristic windows. In this case, the first window image acquisition unit 102 suffices to generate at least one window image. For image alignment, the first window image acquisition unit 102 generally generates a number of window images equal to or larger than the number of dimensions of an image. For example, when the first image is a three-dimensional image, the first window image acquisition unit 102 generates three or more window images.

The second image acquisition unit 111 acquires the second image. The second image acquisition unit 111 can acquire the second image from, for example, a storage apparatus such as the image recording apparatus 12. The second image acquisition unit 111 may acquire the second image from an image generation apparatus such as the imaging apparatus 11. The second image acquisition unit 111 outputs the acquired second image to the second window image acquisition unit 112 and image generation unit 116.

The second window image acquisition unit 112 generates the second window image group by cutting out a plurality of subregions from the second image acquired from the second image acquisition unit 111 (second setting means and second extraction means).

For each window image of the second window image group generated by the second window image acquisition unit 112, the second polynomial approximation unit 113 calculates a polynomial which approximates a window image, similar to the first polynomial approximation unit 103. The second polynomial approximation unit 113 outputs information about the calculated polynomial to the second feature value calculation unit 114.

Based on the information about the polynomial acquired from the second polynomial approximation unit 113, the second feature value calculation unit 114 calculates the feature value of each window image included in the second window image group, similar to the first feature value calculation unit 104. The second feature value calculation unit 114 outputs the calculated feature value to the correspondence calculation unit 115.

The correspondence calculation unit 115 calculates correspondence between the first window image group and the second window image group based on the pieces of information acquired from the characteristic window selection unit 105 and second feature value calculation unit 114 (correspondence means). Details of processing to be performed by the correspondence calculation unit 115 will be described later. The correspondence calculation unit 115 outputs the calculated correspondence to the image generation unit 116.

The image generation unit 116 generates an output image based on the correspondence calculated by the correspondence calculation unit 115, the first image acquired by the first image acquisition unit 101, and the second image acquired by the second image acquisition unit 111 (alignment means and second output means). The image generation unit 116 may output the generated output image to a display apparatus (not shown).

Figure 2:
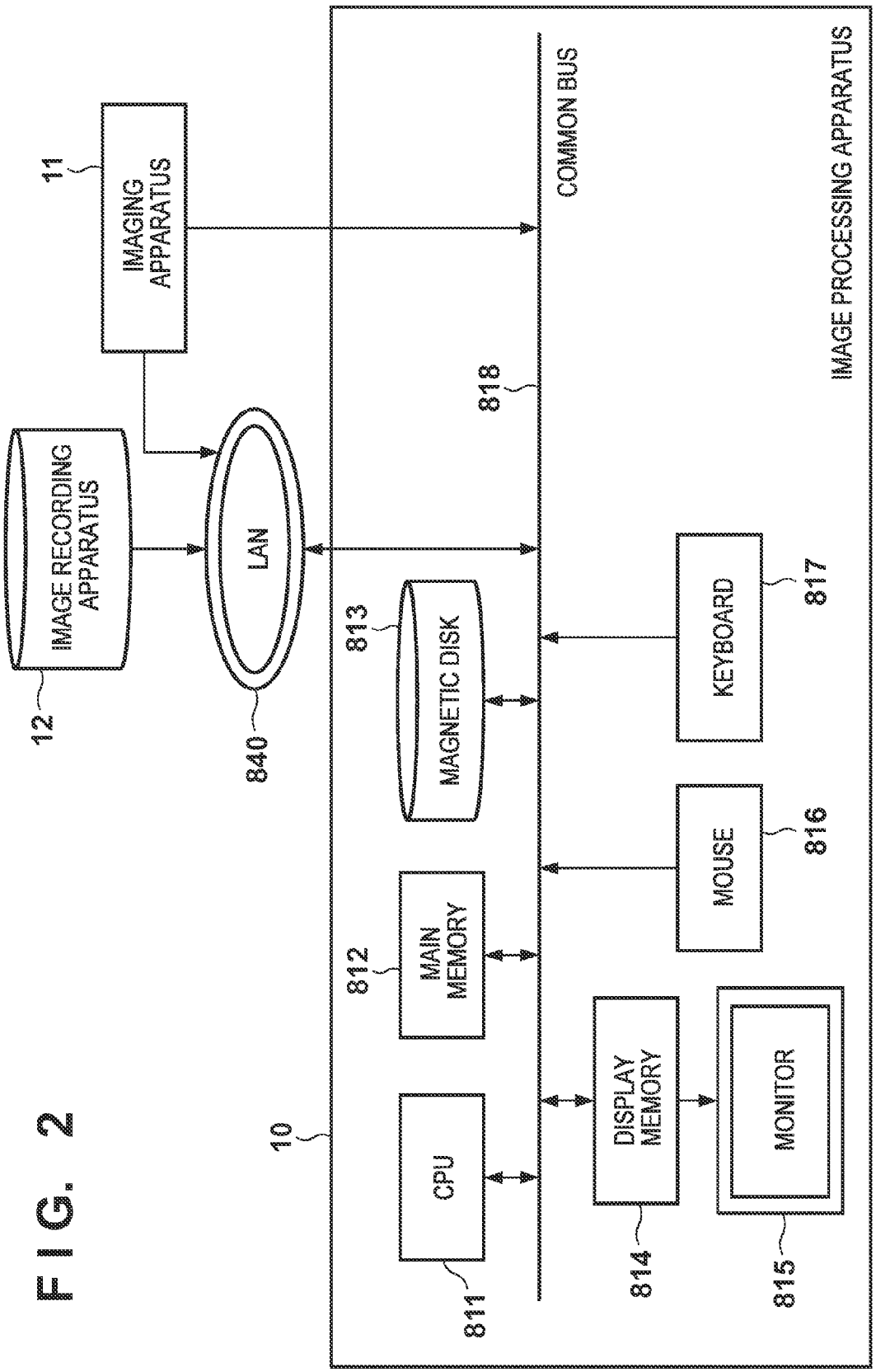
FIG. 2 is a block diagram showing the apparatus arrangement of the image processing system according to the first embodiment.

FIG. 2 shows the arrangement of an image processing system according to the embodiment, including the image processing apparatus 10 according to the embodiment. The image processing system according to the embodiment includes the image processing apparatus 10, the image recording apparatus 12, a local area network (LAN) 840, and the imaging apparatus 11.

The imaging apparatus 11 can capture an image, and is an ultrasonic imaging apparatus in the embodiment. The imaging apparatus 11 in the embodiment ultrasonically images the inside of a subject by bringing an ultrasonic probe (not shown), which transmits and receives an ultrasonic wave, into contact with the subject. An image captured by the imaging apparatus 11 in the embodiment is a three-dimensional B-mode ultrasonic image which captures a predetermined three-dimensional area of a subject.

The imaging apparatus 11 stores the captured image in the image recording apparatus 12. The image recording apparatus 12 is an apparatus capable of reading out and writing an image. The image recording apparatus 12 can read out and transmit the stored first and second images in accordance with a request from the image processing apparatus 10. The imaging apparatus 11 and image recording apparatus 12 are connected to the image processing apparatus 10 via the LAN 840 in FIG. 2, but may be connected to a common bus 818 (to be described later) of the image processing apparatus 10 directly or via an interface.

The image processing apparatus 10 according to the embodiment can be implemented using a general personal computer (PC). However, the image processing apparatus 10 may be implemented by dedicated hardware elements for implementing the functions of the respective units shown in FIG. 1. For example, the first polynomial approximation unit 103 and first feature value calculation unit 104 may be implemented by the first obtaining unit which obtains an image, calculation hardware which calculates a feature value, and the first output unit which outputs the feature value.

FIG. 2 further shows the electrical arrangement of the image processing apparatus 10 implemented by a computer. The image processing apparatus 10 includes a central processing unit (CPU) 811, main memory 812, magnetic disk 813, display memory 814, monitor 815, mouse 816, and keyboard 817. The CPU 811 mainly controls the operations of the respective building components of the image processing apparatus 10.

The main memory 812 stores a control program to be executed by the CPU 811, and provides a work area when the CPU 811 executes a program. The magnetic disk 813 stores an operating system (OS), the device driver of a peripheral device, various application software including a program for performing alignment processing (to be described later), and the like. A computer program stored in a storage medium such as the magnetic disk 813 is read out to the main memory 812.

In accordance with the program, the CPU 811 controls the respective units of the image processing apparatus 10, implementing processing according to the embodiment.

The display memory 814 temporarily stores display data for the monitor 815. The monitor 815 is, for example, a CRT monitor or liquid crystal monitor, and displays an image based on data input to the display memory 814. The mouse 816 and keyboard 817 are input interfaces. By using the mouse 816 and keyboard 817, the user performs pointing input, text input, command input, and the like. These building components are connected via the common bus 818 to be able to communicate with each other.

Figure 3:
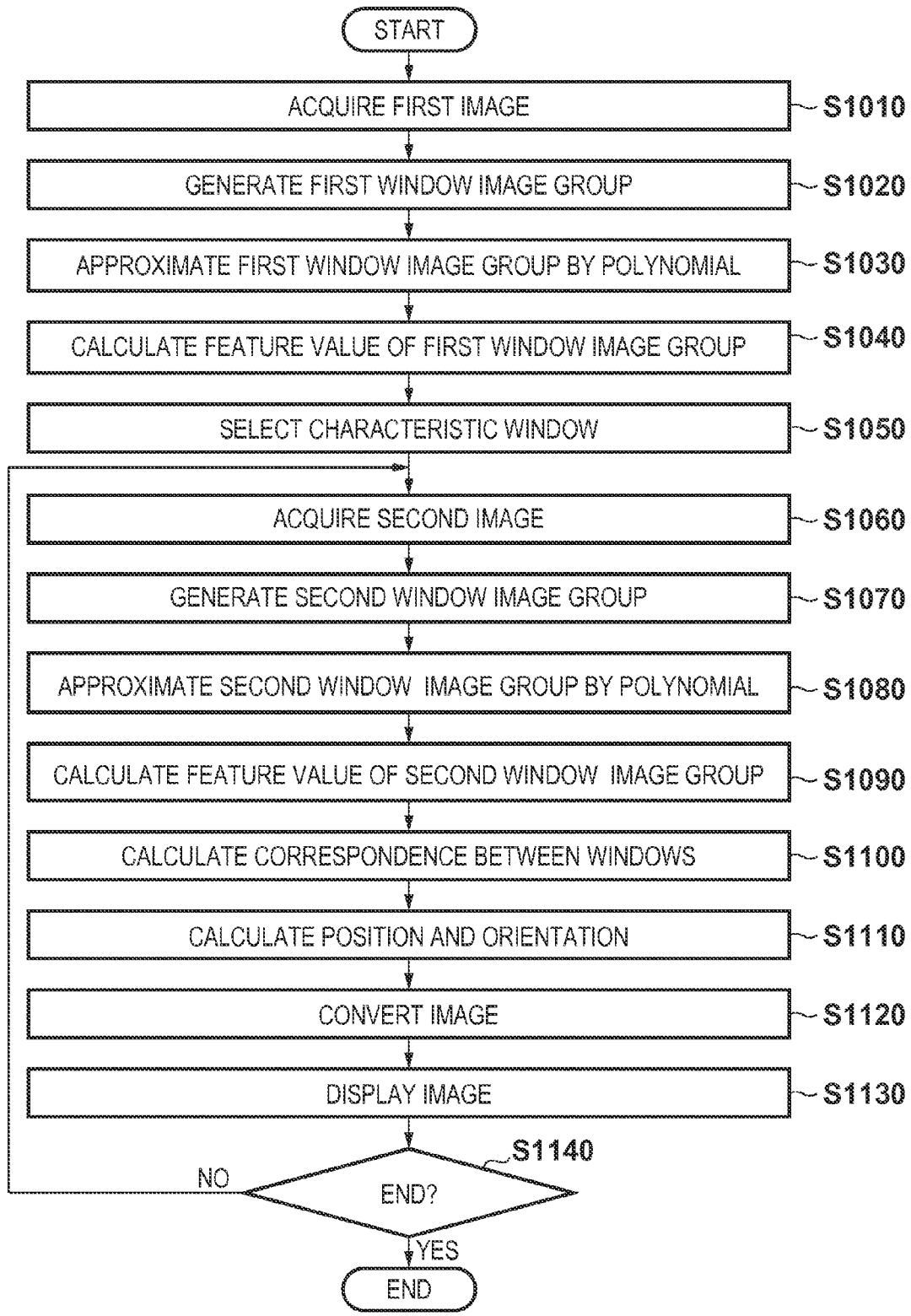
FIG. 3 is a flowchart showing a processing sequence by an image processing apparatus 10 according to the first embodiment.

Next, overall processing to be performed by the image processing apparatus 10 will be described in detail with reference to the flowchart of FIG. 3. In the embodiment, this processing is implemented by executing, by the CPU 811, a program which is stored in the main memory 812 and implements the function of each unit. The result of each processing to be performed by the image processing apparatus 10 (to be described later) is stored and recorded in the main memory 812.

(Step S1010) Acquisition of First Image

In step S1010, the first image acquisition unit 101 acquires the first image. The first image is an image obtained by imaging a subject by the imaging apparatus 11, and is recorded in the image recording apparatus 12. The first image is a three-dimensional image obtained by ultrasonically imaging the three-dimensional area of the subject. The first image is a set of pairs of a plurality of three-dimensional position coordinate vectors $X_{1,i}$ in the reference coordinate system of the imaging apparatus 11, and intensity values $b_{1,i}$ corresponding to the respective coordinate vectors. The intensity value is synonymous with a pixel value, and is generally color information of a pixel. In this case, the three-dimensional position coordinate vector is given by $X_{1,i}=[x_{1\_i}, y_{1\_i}, z_{1\_i}]^T$ ($1 \leq i \leq N_1$). Note that $1 \leq i \leq N_1$, and $N_1$ is the number of pixels which form the first image.

The first image may be a set of pairs of coordinates corresponding to the lattice points of a three-dimensional lattice having axes perpendicular to each other, and intensity values at the respective coordinates. Alternatively, the first image may be a set of two-dimensional plane images having a three-dimensional position and orientation. For example, a position & orientation sensor is attached to a two-dimensional ultrasonic probe and captures a plurality of two-dimensional images, thereby acquiring a three-dimensional image in the latter case.

(Step S1020) Generation of First Window Image Group

In step S1020, the first window image acquisition unit 102 generates the first window image group by cutting out a plurality of subregions (windows) from the first image acquired from the first image acquisition unit 101. Detailed contents of this processing will be explained with reference to FIG. 4.

Figure 4:
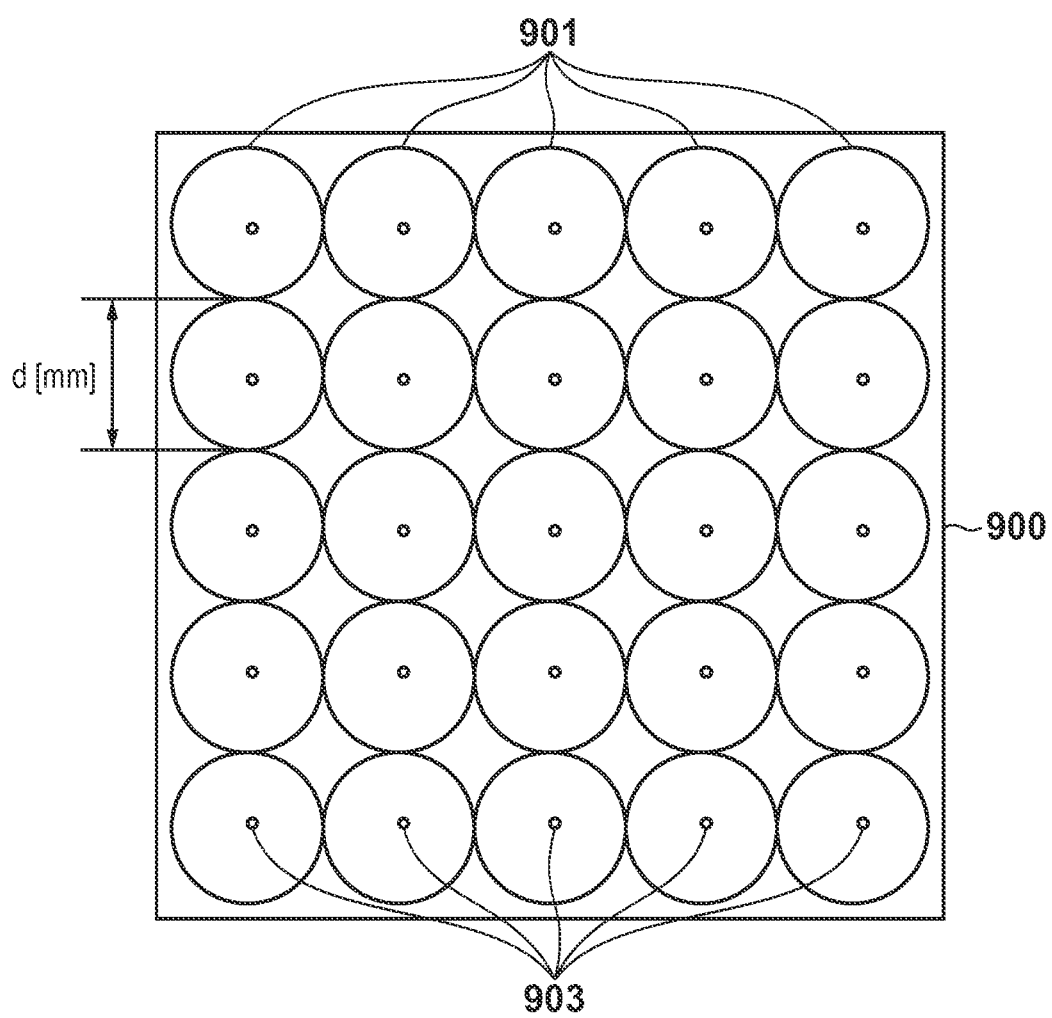
FIG. 4 is a view for explaining a window image according to the first embodiment.

Referring to FIG. 4, an area 900 of the first image is the entire area of the first image acquired in step S1010. Although the first image in the embodiment is a three-dimensional image, the first image is represented as a two-dimensional image in FIG. 4 for illustrative convenience.

In step S1020, a plurality of window areas 901 (first subregion group) are set in the area 900 (image area) of the first image. The plurality of window areas 901 will be referred to as a window area group. In the example shown in FIG. 4, the respective window areas 901 are arranged at equal intervals. The respective window areas 901 have the same size, and are arranged in contact with each other. However, the window area arrangement method is not limited to the example of FIG. 4. For example, the respective window areas 901 may overlap each other, or may be spaced apart from each other. The shape of the window area 901 is arbitrary.

The first window image acquisition unit 102 cuts out (extracts) an image in each window area 901 from the first image. The cutout image will be called the first window image. In this manner, the first window image acquisition unit 102 generates the first window images corresponding to the respective window areas 901. The plurality of first window images will be called the first window image group (first partial image group).

In the embodiment, each window area 901 included in the window area group is an area having a spherical shape in the three-dimensional space. In FIG. 4, each window area 901 is circular for illustrative convenience. Assume that each window area is a sphere having a diameter d [mm]. A three-dimensional vector $X_{WC1,j}=[x_{WC1,j}, y_{WC1,j}, z_{WC1,j}]^T$ ($1 \leq j \leq N_{W1}$) represents the center position of the jth window (to be referred to as a window center position hereinafter). $N_{W1}$ is the total number of window images cut out from the first image.

Each first window image includes a plurality of pixels. Each pixel is expressed by a three-dimensional vector representing a pixel position in the window, and an intensity value. $X_{W1,j,k}=[x_{W1,j,k}, y_{W1,j,k}, z_{W1,j,k}]^T$ ($1 \leq j \leq N_{W1}$, $1 \leq k \leq N_{PN1,j}$) is a three-dimensional vector representing the position of the kth pixel in the jth window. The three-dimensional vector $X_{W1,j,k}$ is a position vector using the center position $X_{WC1,j}$ of each window as the origin (reference point). $b_{W1,j,k}(b_k)$ ($1 \leq j \leq N_{W1}$, $1 \leq k \leq N_{PN1,j}$) is the intensity value of a pixel corresponding to the three-dimensional vector $X_{W1,j,k}(x_k)$. $N_{PN1,j}$ (N pixels) is the number of pixels of the jth window image.

The first window image acquisition unit 102 records the window center position $X_{WC1,j}$ ($1 \leq j \leq N_{W1}$) of each first window image generated in the above way. For each first window image, the first window image acquisition unit 102 records pairs of the pixel position $X_{W1,j,k}$ ($1 \leq j \leq N_{W1}$, $1 \leq k \leq N_{PN1,j}$) and the intensity value $b_{W1,j,k}$ ($1 \leq j \leq N_{W1}$, $1 \leq k \leq N_{PN1,j}$) of the pixel.

In the embodiment, the three-dimensional vector $X_{W1,j,k}$ is defined as a position vector using the center position $X_{WC1,j}$ of each window as the origin (reference point). However, the origin of the position vector is not limited to the center of the window. The origin of the position vector can be set at an arbitrary position. In this case, the origin position of the position vector is recorded for each window image, instead of the window center position.

(Step S1030) Polynomial Approximation of First Window Image Group

In step S1030, the first polynomial approximation unit 103 calculates a polynomial for each first window image generated in step S1020. More specifically, the first polynomial approximation unit 103 acquires each first window image (first obtaining means). For each first window image, the first polynomial approximation unit calculates a polynomial which approximates the relationship between the pixel position $X_{W1,j,k}$ and the intensity value $b_{W1,j,k}$ of the pixel. Note that $1 \leq j \leq N_{W1}$, and $1 \leq k \leq N_{PN1,j}$. The first polynomial approximation unit 103 outputs information representing the calculated polynomial.

Step S1030 will be explained in detail. In general, an $N_{degree}$ degree polynomial using variables x, y, and z can be expressed using equation (1):

$$p(x, y, z) = \sum_{0 \leq l, 0 \leq m, 0 \leq n, l+m+n \leq N_{degree}} a_{lmn} x^l y^m z^n \quad (1)$$

$$= \underbrace{(1 \ x \ y \ z \ ... \ z^N)}_{m(x,y,z)^T} \underbrace{(a_{000} \ a_{100} \ a_{010} \ a_{001} \ ... \ a_{00N})^T}_{a^T}$$

Since an image is a three-dimensional image in the embodiment, the image can be approximated using this polynomial. If an image is a two-dimensional image, x and y may be used as variables. If an image is a four-dimensional image, x, y, z, and t may be used as variables.

In equation (1), $p(x, y, z)$ is an intensity value (approximate value) obtained by the polynomial for a pixel at coordinates $(x, y, z)$. $m(x, y, z)$ is a function of obtaining a vector based on the coordinate value $(x, y, z)$. More specifically, $m(x, y, z)$ is a column vector. The column vector $m(x_k, y_k, z_k)$ of the kth pixel in the image has a component $x_k^l y_k^m z_k^n$ ($l+m+n \leq N_{degree}$; l, m, and n are integers of 0 or more).

The values of the respective elements of the column vector $m(x, y, z)$ are values excluding coefficients (values not multiplied by coefficients) for a plurality of monomials which form the polynomial. In other words, the column vector $m(x, y, z)$ contains, as an element, the product of the coordinate values of respective pixels in a window image. $a_{lmn}$ is the coefficient of the $x^l y^m z^n$ term in a monomial which forms the polynomial. Calculating the polynomial corresponds to calculating each coefficient $a_{lmn}$.

More specifically, the first polynomial approximation unit 103 calculates the coefficient vector $a_{W1,j}$ of the polynomial for the jth window image of the first window image group to minimize the mean square error of equation (2):

$$p_j(x_{W1,j,k}, y_{W1,j,k}, z_{W1,j,k}) = b_{W1,j,k} \ (1 \leq k \leq N_{PN1,j}) \quad (2)$$

$$(p_j(x_{W1,j,k}, y_{W1,j,k}, z_{W1,j,k}) = m(x_{W1,j,k}, y_{W1,j,k}, z_{W1,j,k})^T a_{W1,j})$$

where $x_{W1,j,k}$, $y_{W1,j,k}$, and $z_{W1,j,k}$ are the x-, y-, and z-coordinates of the kth pixel of the jth window image in the first window image group. In this case, $1 \leq k \leq N_{PN1,j}$. $p_j(x, y, z)$ is the intensity value of the pixel at the coordinates $(x, y, z)$ that is obtained by a polynomial for the jth window image.

For example, the coefficient vector $a_{W1,j}$ can be obtained as follows. For the jth window image, equation (3) can be derived from equation (2) for the first to $N_{PN1,j}$ th pixels:

$$\underbrace{\begin{pmatrix} m(x_{W1,j,1}, y_{W1,j,1}, z_{W1,j,1})^T \\ \vdots \\ m(x_{W1,j,N_{PN1,j}}, y_{W1,j,N_{PN1,j}}, z_{W1,j,N_{PN1,j}})^T \end{pmatrix}}_{M_{W1,j}} a_{W1,j} = \underbrace{\begin{pmatrix} b_{W1,j,1} \\ \vdots \\ b_{W1,j,N_{PN1,j}} \end{pmatrix}}_{b_{W1,j}} \quad (3)$$

By using the matrix $M_{W1,j}$ and the vector $b_{W1,j}$, equation (3) can be rewritten into equation (4):

$$M_{W1,j} a_{W1,j} = b_{W1,j} \quad (4)$$

The vector $b_{W1,j}$ is a vector having, as a component, the intensity value of each pixel of the jth window image. The matrix $M_{W1,j}$ is called a monomial matrix for the jth window image. The matrix $M_{W1,j}$ is a matrix of $N_{PN1}$ rows and A columns. A is the number of monomials which form the polynomial, that is, the number of coefficients $a_{000}, ..., a_{00N}$. As detailed processing, the monomial matrix $M_{W1,j}$ is generated from the positions $X_{W1,j,1}, ..., X_{W1,j,NPN1}$ of the first to $N_{PN1,j}$th pixels in the jth window image (in the image).

Then, the first polynomial approximation unit 103 QR-decomposes the monomial matrix $M_{W1,j}$ into a matrix $Q_{W1,j}$ (first matrix) and a matrix $R_{W1,j}$ (second matrix), as represented by equation (5):

$$M_{W1,j} = Q_{W1,j} R_{W1,j} \quad (5)$$

where the matrix $Q_{W1,j}$ is an orthogonal matrix, and the matrix $R_{W1,j}$ is an upper triangular matrix. The QR decomposition can be executed using a well-known method such as the Householder method or Gram-Schmidt method. The orthogonal matrix is a matrix in which the inner product of two arbitrary row vectors becomes 0. The orthogonal matrix Q is a matrix of $N_{PN1}$ rows and A columns, and the matrix R is a matrix of A rows and A columns. The first information represents each element value of the first matrix, and the second information represents each element value of the second matrix.

Finally, the first polynomial approximation unit 103 calculates the coefficient $a_{W1,j}$ by back-substitution using equation (6) derived from equations (4) and (5):

$$R_{W1,j} a_{W1,j} = Q_{W1,j}^T b_{W1,j} \quad (6)$$

In this fashion, the approximation polynomial of equation (1) having the coefficient $a_{W1,j}$ is obtained. The first polynomial approximation unit 103 calculates the coefficient $a_{W1,j}$, matrix $Q_{W1,j}$, and matrix $R_{W1,j}$ ($1 \leq j \leq N_{W1}$) in the above way for all the window images included in the first window image group generated in step S1020. The first polynomial approximation unit 103 records the calculated coefficient $a_{W1,j}$, matrix $Q_{W1,j}$, and matrix $R_{W1,j}$ as information about the polynomial which approximates the window image.

(Step S1040) Calculation of Feature value of First Window Image Group

In step S1040, the first feature value calculation unit 104 calculates the feature value of each window image included in the first window image group, based on the information about the polynomial calculated in step S1030. More specifically, the first feature value calculation unit 104 calculates a vector $c_{W1,j}$ ($1 \leq j \leq N_{W1}$) for each window image by multiplication according to equation (7):

$$R_{W1,j} a_{W1,j} = R_{W1,j} \begin{pmatrix} a_{W1,j,000} \\ a_{W1,j,100} \\ a_{W1,j,010} \\ a_{W1,j,001} \\ a_{W1,j,200} \\ \vdots \\ a_{W1,j,00N_{degree}} \end{pmatrix} \quad (7)$$

$$= \begin{pmatrix} c_{W1,j,000} \\ c_{W1,j,100} \\ c_{W1,j,010} \\ c_{W1,j,001} \\ c_{W1,j,200} \\ \vdots \\ c_{W1,j,00N_{degree}} \end{pmatrix}$$

$$= c_{W1,j}$$

The calculation method of vector $c_{W1,j}$ is not limited to equation (7). Since the relation of equation (5) is approximately established, the vector $c_{W1,j}$ can be calculated by multiplication according to equation (8):

$$Q_{W1,j}{}^T b_{W1,j} = c_{W1,j} \quad (8)$$

By using either equation (7) or (8), almost the same vector $c_{W1,j}$ ($1 \leq j \leq N_{W1}$) can be calculated (first calculation means).

Since the matrix $Q_{W1,j}$ is an orthogonal matrix, each row of the matrix $Q^T_{W1,j}$ serves as an orthogonal base (orthogonal vector). Each row of the matrix $Q^T_{W1,j}$ corresponds to a value from which the coefficient of each monomial is excluded, that is, $x^l y^m z^n$ ($l+m+n \leq N_{degree}$; l, m, and n are integers of 0 or more). In other words, each row of the matrix $Q^T_{W1,j}$ serves as a base corresponding to the $x^l y^m z^n$ term in a plurality of monomials.

The vector $c_{W1,j} = Q^T_{W1,j} b_{W1,j}$ represents the coordinate value of the intensity value vector $b_{W1,j}$ in an orthogonal space defined by the matrix $Q^T_{W1,j}$. That is, the component $c_{W1,j,lmn}$ (value $c_{lmn}$) of the vector $c_{W1,j}$ corresponding to the $x^l y^m z^n$ term represents the influence of the $x^l y^m z^n$ term on the intensity value vector $b_{W1,j}$. That is, $c_{W1,j,lmn}$ indicates the degree of contribution of the $x^l y^m z^n$ term to an intensity value obtained by the approximation polynomial. Hence, $c_{W1,j,lmn}$ represents the degree of contribution of the $x^l y^m z^n$ term to the approximation accuracy. The value $c_{W1,j,lmn}$ can be considered as a feature value corresponding to the $x^l y^m z^n$ term.

Further, the first feature value calculation unit 104 calculates the degree of contribution of the pth-order term to the approximation accuracy from the degree of contribution of the $x^l y^m z^n$ term ($1+m+n=p$; l, m, and n are integers of 0 or more) to the approximation accuracy (second calculation means). The degree of contribution of an order of interest can be obtained from the degree of contribution of one or more polynomials having the order of interest. More specifically, the first feature value calculation unit 104 calculates a feature value vector $f_{W1,j}$ ($1 \leq j \leq N_{W1}$) according to equation (9) using the respective elements of the vector $c_{W1,j}$ ($1 \leq j \leq N_{W1}$)

$$f_{W1,j} = \begin{pmatrix} f_{W1,j,0} \\ f_{W1,j,1} \\ f_{W1,j,2} \\ \vdots \\ f_{W1,j,N_{degree}} \end{pmatrix} = \begin{pmatrix} \sum_{0 \leq l, 0 \leq m, 0 \leq n, l+m+n=0} c^2_{W1,j,lmn} \\ \sum_{0 \leq l, 0 \leq m, 0 \leq n, l+m+n=1} c^2_{W1,j,lmn} \\ \sum_{0 \leq l, 0 \leq m, 0 \leq n, l+m+n=2} c^2_{W1,j,lmn} \\ \vdots \\ \sum_{0 \leq l, 0 \leq m, 0 \leq n, l+m+n=N_{degree}} c^2_{W1,j,lmn} \end{pmatrix} \quad (9)$$

In the embodiment, the sum of squares of degrees of contribution of respective terms to the approximation accuracy is defined as the degree of contribution of respective orders to the approximation accuracy, as represented by equation (9).

The feature value vector $f_{W1,j}$ is a set of numerical values representing degrees of contribution of respective orders. Each element of the feature value vector $f_{W1,j}$ ($1 \leq j \leq N_{W1}$) means the degree of contribution of each order to approximation of the polynomial which approximates a window image. More specifically, the pth element $f_{W1,j,p}$ (value $f_p$) represents the degree of contribution of the pth-order term. The feature value vector $f_{W1,j}$ is invariant regardless of rotation of a window image. For this reason, the feature value vector $f_{W1,j}$ can be used to align a plurality of images which may rotate about a predetermined point. The value $f_{W1,j,p}$ can be regarded as a feature value corresponding to the order p. The first feature value calculation unit 104 calculates a feature value vector $f_{W1,j}$ ($1 \leq j \leq N_{W1}$) by executing this processing for each polynomial calculated in step S1030. The first feature value calculation unit 104 records the calculated feature value vector (first output means).

According to the embodiment, the first polynomial approximation unit 103 performs polynomial approximation for each window image. The polynomial coefficient $a_{W1,j}$, matrix $Q_{W1,j}$, and matrix $R_{W1,j}$, are recorded as described above. However, the first feature value calculation unit 104 can calculate the vector $c_{W1,j}$ and feature value vector $f_{W1,j}$ from the matrix $Q_{W1,j}$ and intensity value vector $b_{W1,j}$, as represented by equation (8). Thus, by calculating the matrix $Q_{W1,j}$ by the first polynomial approximation unit 103, the feature value vector $f_{W1,j}$ can be sufficiently obtained. Since the matrix $Q_{W1,j}$ is derived from the monomial matrix $M_{W1,j}$, it is not indispensable in practice to obtain the polynomial coefficient $a_{W1,j}$ by the first polynomial approximation unit 103, that is, perform polynomial approximation.

(Step S1050) Selection of Characteristic Window Image

In step S1050, the characteristic window selection unit 105 selects a characteristic window image based on feature value vectors calculated in step S1040 for the respective first window images. The characteristic window image is used to detect correspondence between windows in step S1100 (to be described later).

Processing in step S1050 is performed according to the following procedures. For each window image (first partial image of interest), the minimum value of a difference between the window image and another window image (partial image other than the first partial image of interest) is calculated. More specifically, for the jth window image, differences between $f_{W1,j}$, and $f_{W1,1}, \ldots, f_{W1,j-1}, f_{W1,NW1}$ are calculated. Then, a minimum value is selected from the calculated differences.

The feature value vector difference calculation method can be an arbitrary method. For example, the $L_1$ norm of a difference vector between feature value vectors may be calculated as a difference. At this time, the $L_1$ norm may be obtained simply using feature value vectors. Alternatively, the $L_1$ norm may be calculated after performing pre-processing such as normalization for feature value vectors in advance.

When the minimum value of a difference obtained for each window image is equal to or larger than a predetermined threshold, the window image is selected as a characteristic window image. The characteristic window selection unit 105 records the feature value vector of the selected characteristic window image and the center position of the characteristic window image. In the following description, $f_{W1S,k}$ is the feature value vector of the kth characteristic window image, and $X_{WC1S,k}$ ($1 \leq k \leq N_{W1S}$) is the center position of the window. $N_{W1S}$ is the total number of selected window images.

In processing of step S1050, the characteristic window selection unit 105 can select, from the window image group of the first image, a characteristic window image for which the feature value difference from another window image is equal to or larger than the threshold. A window image corresponding to the selected characteristic window is selected from the second window image group, which will be described later. The characteristic window image is predicted to have an image feature discriminable from others even in the first image. Detecting a window image corresponding to the characteristic window image from the second window image group in the following manner is expected to lead to higher-accuracy alignment.

In the embodiment, the feature value vector difference and characteristic window image are determined in this fashion. However, an arbitrary method is usable in step S1050 to select a window image having a large difference from other window images. For example, the characteristic window selection unit 105 may select a predetermined number of window images having larger minimum values of feature value differences from all other window images.

(Step S1060) Acquisition of Second Image

In step S1060, the second image acquisition unit 111 acquires the second image. The second image is an image similar to the first image. The second image is a set of pairs of a plurality of three-dimensional position coordinate vectors $X_{2,i}$ in the reference coordinate system of the imaging apparatus 11, and intensity values $b_{2,i}$ corresponding to the respective coordinate vectors. In this case, the three-dimensional position coordinate vector is given by $X_{2,i}=[x_{2\_i}, y_{2\_i}, z_{2\_i}]^T$ ($1 \leq i \leq N_2$). Note that $1 \leq i \leq N_2$, and $N_2$ is the number of pixels which form the second image. The second image may be a set of two-dimensional ultrasonic images which have a three-dimensional position and orientation, which images have been captured during a predetermined time period.

(Step S1070) Generation of Second Window Image Group

In step S1070, the second window image acquisition unit 112 cuts out (extracts) a plurality of subregions (windows; second subregion group) from the second image acquired from the second image acquisition unit 111. As a result, the second window image acquisition unit 112 generates the second window image group (second partial image group). The operation of the second window image acquisition unit 112 is the same as that of the first window image acquisition unit 102. $X_{WC2,j}=[x_{WC2,j}, y_{WC2,j}, z_{WC2,j}]^T$ ($1 \leq j \leq N_{W2}$) is the center position of each second window image. $N_{W2}$ is the total number of second window images.

$X_{W2,j,k}=[x_{W2,j,k}, y_{W2,j,k}, z_{W2,j,k}]^T$ ($1 \leq j \leq N_{W2}$, $1 \leq k \leq N_{PN2,j}$) is a three-dimensional vector representing the position of the kth pixel in the jth window. $b_{W2,j,k}$ ($1 \leq j \leq N_{W2}$, $1 \leq k \leq N_{PN2,j}$) is the intensity value of a pixel corresponding to the three-dimensional vector $X_{W2,j,k}$. $N_{PN2,j}$ is the number of pixels of the jth window image.

The number of window images acquired by the second window image acquisition unit 112 may be equal to or different from that of window images acquired by the first window image acquisition unit 102. The position and size of a window area group set by the second window image acquisition unit 112 may be equal to or different from those of a window area group set by the first window image acquisition unit 102.

(Step S1080) Polynomial Approximation of Second Window Image Group

In step S1080, the second polynomial approximation unit 113 calculates a polynomial for each image included in the second window image group generated in step S1070. Processing by the second polynomial approximation unit 113 in step S1080 is the same as that by the first polynomial approximation unit 103 in step S1030. In step S1080, the second polynomial approximation unit 113 calculates and records a coefficient vector $a_{w2,j}$, matrix $Q_{w2,j}$, and matrix $R_{W2,j}$ ($1 \leq j \leq N_{W2}$) for the jth window image similarly to step S1070.

(Step S1090) Calculation of Feature value of Second Window Image Group

In step S1090, the second feature value calculation unit 114 calculates the feature value of each image included in the second window image group, based on the polynomial calculated in step S1080. In step S1090, the feature value can be calculated similarly to step S1050. The second feature value calculation unit 114 calculates and records the feature value vector $f_{W2,j}$ ($1 \leq j \leq N_{W2}$) of the jth window image.

(Step S1100) Calculation of Correspondence between Windows

In step S1100, the correspondence calculation unit 115 makes the characteristic window image selected from the first window image group in step S1050 and a window image included in the second window image group correspond to each other. More specifically, the correspondence calculation unit 115 selects a window image similar to each characteristic window image from the second window image group. For example, for each characteristic window image, the correspondence calculation unit 115 searches the second window image group for an image having a feature value vector $f_{W2,j}$ ($1 \leq j \leq N_{W2}$) similar to a feature value vector $f_{W1S,k}$ ($1 \leq k \leq N_{W1S}$).

More specifically, the correspondence calculation unit 115 searches feature value vectors $f_{W2,j}$ ($1 \leq j \leq N_{W2}$) for a feature value vector most similar to each feature value vector $f_{W1S,k}$ ($1 \leq k \leq N_{W1S}$) based on a predetermined criterion. For example, when the $L_1$ norm of a difference vector between two feature value vectors is smaller, it can be determined that these two feature value vectors are more similar. The difference vector may be a difference between feature value vectors directly, or a difference between feature value vectors having undergone pre-processing such as normalization.

By processing in step S1100, an image corresponding to each characteristic window image is selected from the second window image group. $f_{W2S,k}$ ($1 \leq k \leq N_{W1S}$) is the feature value vector of an image which corresponds to the kth characteristic window image and is selected from the second window image group. $X_{WC2S,k}$ ($1 \leq k \leq N_{W1S}$) is the center position of the selected image. The correspondence calculation unit 115 records the feature value vectors and center positions of images corresponding to these characteristic window images.

(Step S1110) Calculation of Position and Orientation Between Images

In step S1110, the correspondence calculation unit 115 calculates the position & orientation relationship between the first and second images based on the correspondence obtained in step S1100. More specifically, the correspondence calculation unit 115 calculates the position & orientation relationship in accordance with the relationship between the position of each characteristic window image and the position of a corresponding window image selected from the second window images.

More specifically, the correspondence calculation unit 115 can calculate the position & orientation relationship in accordance with the relationship between the center position $X_{WC1S,k}$ ($1 \leq k \leq N_{W1S}$) of each characteristic window image and the center position $X_{WC2S,k}$ ($1 \leq k \leq N_{W1S}$) of a corresponding window image. For example, the correspondence calculation unit 115 may obtain a rigid transformation which approximates best the relationship between $X_{WC1S,k}$ ($1 \leq k \leq N_{W1S}$) and $X_{WC2S,k}$ ($1 \leq k \leq N_{W1S}$). By using the rigid transformation, the first and second images can be aligned so that the center position of the characteristic window image and that of a corresponding window image come close to each other. The rigid transformation processing can be executed using a well-known technique such as singular value decomposition.

The position & orientation relationship is calculated not only by using the center of a window image, but also by using arbitrary information representing the position of a window image. By using the obtained position & orientation relationship, the first and second images can be aligned so that a window area from which the characteristic window image is cut out, and a window area from which a corresponding window image is cut out come close to each other.

When calculating the position & orientation relationship, the correspondence calculation unit 115 may equally handle pairs each of a characteristic window image and corresponding image. However, when calculating the position & orientation relationship, the correspondence calculation unit 115 may weight pairs each of a characteristic window image and corresponding image. For example, the correspondence calculation unit 115 may apply, to pairs each of a characteristic window image and corresponding image, weights complying with the $L_1$ norms of difference vectors between feature value vectors that have been calculated in step S1100. More specifically, when the difference between feature value vectors is smaller, the correspondence calculation unit 115 may apply a larger weight to a pair of a characteristic window image and corresponding image. In this case, the rigid transformation can be obtained by putting importance on a pair of window images having higher similarity. The correspondence calculation unit 115 may adopt a well-known outlier removal method such as RANSAC. In this case, the rigid transformation can be obtained at more stable accuracy.

In step S1110, instead of the rigid transformation, the correspondence calculation unit 115 may obtain a nonlinear position & orientation relationship between the first and second images based on the correspondence obtained in step S1100. For example, the correspondence calculation unit 115 may calculate a nonlinear transform function which makes the center positions $X_{WC1S,k}$ ($1 \le k \le N_{W1S}$) and $X_{WC2S,k}$ ($1 \le k \le N_{W1S}$) of corresponding windows coincide with or substantially coincide with each other. In this case, the nonlinear transform function can be a well-known one such as a radial basis function (RBF) or B-Spline.

(Step S1120) Image Conversion

In step S1120, the image generation unit 116 generates the third image by transforming the coordinates of the second image based on the position & orientation relationship between the first and second images that has been calculated in step S1110. More specifically, the third image is generated by aligning the second image to the first image.

(Step S1130) Image Display

In step S1130, the image generation unit 116 outputs the first and third images. In other words, the image generation unit 116 can align and output the first and second images. The output image may be presented to the user via a display apparatus (not shown). The output image may be stored in a storage medium (not shown). The output image may be input to an information processing apparatus (not shown) for further image processing.

At this time, the image generation unit 116 may directly output the first and third images. The image generation unit 116 may output an image obtained by processing the first and third images. For example, the image generation unit 116 may generate two-dimensional sectional views from the first and third images for the same section. The method of generating an output image is not limited to this. The user can observe the first and third images in comparison with each other based on the output image.

(Step S1140) End Determination

In step S1140, a real-time processing unit (not shown) determines whether to end the overall processing. For example, when the second image to be processed does not remain, the real-time processing unit determines to end the overall processing. If the real-time processing unit determines to end the overall processing, the overall processing of the image processing apparatus 10 ends. If the real-time processing unit determines not to end the overall processing, the process returns to step S1060. In this case, the processes in steps S1060 to S1140 are performed using a newly acquired second image.

The image processing system according to the above-described embodiment can extract, from a window image, a feature value which is invariant regardless of rotation. By using the feature value, the image processing system can make window images extracted from the first and second images correspond to each other. By using the correspondence, the image processing system can align the first and second images. Even if the first image is an image obtained by rotating the second image, alignment can be performed efficiently without considering the rotation (estimating the rotation searchingly).

(Modification 1-1) Limitation of Search Range when Initial Value is Set

In step S1100 according to the first embodiment, the correspondence calculation unit 115 detects a window image similar to a characteristic window image from all window images included in the second window image group. However, the embodiment is not limited to this. For example, when the first and second images are aligned within a predetermined error range, the following processing may be executed. That is, when detecting a window image corresponding to a characteristic window image of interest, a corresponding window image may be detected from only window images positioned near the characteristic window image of interest. More specifically, a corresponding window image is detected from window images falling within a predetermined range from a position of the second image that corresponds to the center position of the characteristic window image of interest. In this case, the feature values of window images within the predetermined range are compared with that of the characteristic window image of interest. Similarly, in step S1050, the characteristic window selection unit 105 may select a characteristic window image by comparing the feature value vectors of only windows within a predetermined range.

When the first and second images are aligned within a predetermined error range, this method can reduce the processing load and can increase the processing speed and efficiency. Since unrelated window images are hardly made to correspond to each other, it is expected to obtain a more accurate alignment result.

(Modification 1-2) Setting of Window Area Using Feature Point Detection

In the first embodiment, the first window image acquisition unit 102 sets window areas in the entire area 900 of the first image at equal intervals. However, the embodiment is not limited to this. For example, in step S1020, the first window image acquisition unit 102 may extract a plurality of feature points from the first image, and set window areas using the respective feature points as their centers. Feature points can be, for example, a portion where the intensity value changes greatly, and a portion having a predetermined pattern. The feature point extraction method can be a well-known method such as Harris Corner Detector. Also, in step S1070, the second window image acquisition unit 112 may extract a plurality of feature points from the second image, and set window areas using the respective feature points as their centers. This method can increase the processing speed and efficiency because it suffices to process only a window image containing a characteristic area in an image.

(Modification 1-3) Image Diversity

In the first embodiment, three-dimensional ultrasonic images are used as input images (first and second images). However, the embodiment is not limited to this. For example, the image may be a two- or four-dimensional image. The four-dimensional image is a time-series set of three-dimensional images. The image type may be another medical image such as an MRI image or CT image. Further, the above-described method may be applied to an image other than a medical image, such as a camera image or range image.

When a two-dimensional image is used as an input image, window images are generated to have a two-dimensional shape such as a circle in steps S1020 and S1070. In steps S1030 and S1080, window images are approximated by a polynomial using variables x and y. The first and second images need not be images of the same type. For example, the first image may be an MRI image, and the second image may be a CT image. In this manner, the dimension of an input image and the imaging method are not limited.

[Second Embodiment] Fixing of Window Area

In the first embodiment, a monomial matrix is generated for each window image included in the first window image group. A monomial matrix is also generated for each window image included in the second window image group. However, the embodiment is not limited to this. In the second embodiment, a plurality of window areas of the same shape is set in the first image. In addition, a plurality of window areas of the same shape is set in the second image. Window areas set in the first image and window areas set in the second image may have the same shape. In this case, the positions of pixels (pixel positions using the center of the window as a reference) which form a window image coincide with each other between the respective window images. Since a common monomial matrix is usable for respective window images, the second embodiment can efficiently perform processing.

Figure 5:
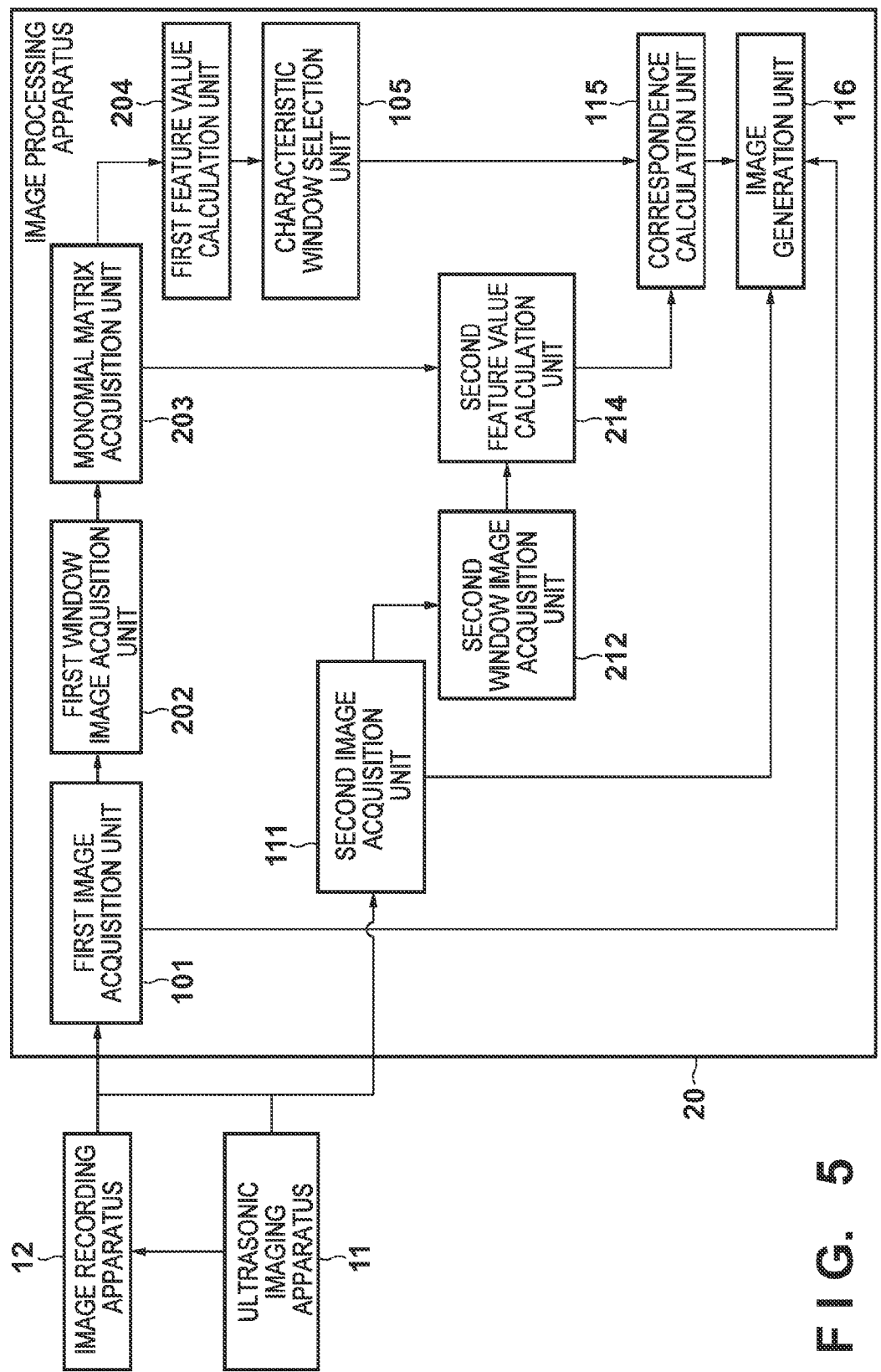
FIG. 5 is a block diagram showing the functional arrangement of an image processing system according to the second embodiment.

FIG. 5 shows the arrangement of an image processing system according to the second embodiment. The same reference numerals as those in the image processing system of the first embodiment denote similar components, and a description thereof will not be repeated. A first window image acquisition unit 202 sets a plurality of window areas in the first image acquired from a first image acquisition unit 101. The set window areas have the same shape and the same number of pixels. The first window image acquisition unit 202 generates the first window image group in accordance with the set window areas, similar to the first embodiment.

A monomial matrix acquisition unit 203 acquires information about a monomial matrix for the first window image group generated by the first window image acquisition unit 202. Detailed processing to be performed by the monomial matrix acquisition unit 203 will be described later.

Based on the first window images generated by the first window image acquisition unit 202 and information about the monomial matrix acquired by the monomial matrix acquisition unit 203, a first feature value calculation unit 204 calculates the feature value of each window image included in the first window image group.

A second window image acquisition unit 212 sets a plurality of window areas in the second image acquired from a second image acquisition unit 111. The set window areas have the same shape and the same number of pixels. The window areas set by the second window image acquisition unit 212 have the same shape and the same number of pixels as those of the window areas set by the first window image acquisition unit 202. The second window image acquisition unit 212 generates the second window image group in accordance with the set window areas, similar to the first embodiment.

Based on the second window images generated by the second window image acquisition unit 212 and information about a monomial matrix acquired by a monomial matrix acquisition unit 203, a second feature value calculation unit 214 calculates the feature value of each window image included in the second window image group.

Figure 6:
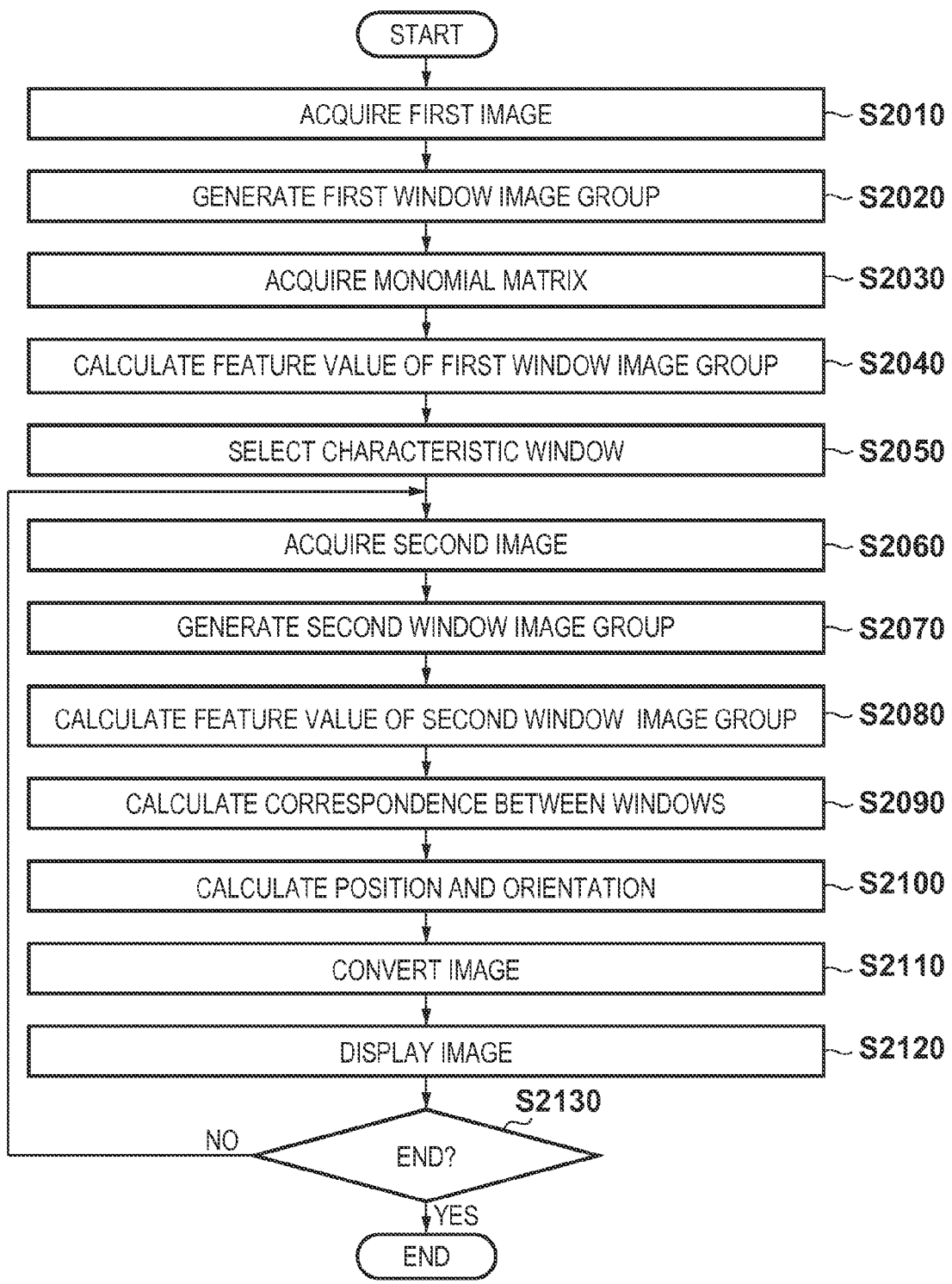
FIG. 6 is a flowchart showing a processing sequence by an image processing apparatus 20 according to the second embodiment.

An operation to be performed by an image processing apparatus 20 according to the second embodiment will be described in detail with reference to the flowchart of FIG. 6. Processing in step S2010 is the same as that in step S1010 according to the first embodiment, and a description thereof will not be repeated.

(Step S2020) Generation of First Window Image Group of Common Size

In step S2020, the first window image acquisition unit 202 generates the first window image group by cutting out a plurality of subregions (windows) from the first image acquired from the first image acquisition unit 201. This processing is the same as that in step S1020 according to the first embodiment except that the respective window images have the same size and shape. The size of the window area can be set arbitrarily in accordance with the image resolution or the like.

In some cases, the arrangement of pixels which form the first image may not be spatially uniform in the area of the first image. In this case, the pixel arrangement is uniformed using an interpolation method such as interpolation processing. Pixels which form a window image are at the same positions with respect to the reference point in the respective window images generated in step S2020. The number of pixels of each window image can be represented as $N_{PN}$. The position vector of the kth pixel using the reference point (for example, window center position) as the origin in each window image can be given by $X_{W,k}$ ($1 \leq k \leq N_{PN}$)

The first window image acquisition unit 202 generates a plurality of window images in accordance with the set window areas. More specifically, the first window image acquisition unit 202 records a window center position and intensity value for each window image included in the first window image group. $X_{WC1,j}$ ($1 \leq j \leq N_{W1}$) represents the center position of the jth window image. $b_{W1,j,k}$ ($1 \leq j \leq N_{W1}$, $1 \leq k \leq N_{EN}$) represents the intensity value of the kth pixel in the jth window image. As described above, the position vector $X_{W,k}$ ($1 \leq k \leq N_{PN}$) of each pixel is also recorded.

(Step S2030) Calculation of Q from Common Monomial Matrix

In step S2030, the monomial matrix acquisition unit 203 generates a monomial matrix using the position vector $X_{W1,k}$ ($1 \leq k \leq N_{PN}$) generated in step S2020. As described above in the first embodiment, the monomial matrix $M_{W1}$ for the jth window image is formed from the vector $m(x_{W1,j,k}, y_{W1,j,k}, z_{W1,j,k})$ ($1 \leq k \leq N_{PN1}$). The vector $m(x_{W1,j,k}, y_{W1,j,k}, z_{W1,j,k})$ is given by the position vector $X_{W1,j,k} = [x_{W1,j,k}, y_{W1,j,k}, z_{W1,j,k}]$ for the respective pixels of the jth window image, as represented by equation (1). In the embodiment, the position vectors of the kth pixels of the respective window images are represented using the common vector $X_{W,k}$. Therefore, the monomial matrices of the respective window images are also represented using the common monomial matrix $M_W$.

In this way, the monomial matrix acquisition unit 203 calculates the monomial matrix $M_W$ common to the respective window images. Similar to the first embodiment, the monomial matrix acquisition unit 203 generates matrices $Q_W$ and $R_W$ by QR-decomposing the monomial matrix $M_W$. The monomial matrix acquisition unit 203 records the generated $M_W$, $Q_W$, and $R_W$ as information about the monomial matrix.

(Step S2040) Calculation of Feature Value of First Window Image Group

In step S2040, the first feature value calculation unit 204 calculates the feature value of each window image included in the first window image group. More specifically, the first feature value calculation unit 204 calculates the feature value of each window image based on the intensity values of pixels which form the window image, and the information about the monomial matrix generated in step S2030.

For example, the first feature value calculation unit 204 can calculate the vector $c_{W1,j}$ according to equation (8). More specifically, the first feature value calculation unit 204 solves equation (8) using the intensity value $b_{W1,j,k}$ ($1 \leq j \leq N_{W1}$, $1 \leq k \leq N_{PN}$) of each pixel of the window image recorded in step S2020, and $Q_W$ generated in step S2030. After that, the first feature value calculation unit 204 can calculate the feature value of the window image using the vector $c_{W1,j}$, similar to the first embodiment. The first feature value calculation unit 204 calculates and records the feature value vector $f_{W1,j}$ ($1 \leq j \leq N_{W1}$) for all the window images generated in step S2020.

Processes in steps S2050 and S2060 are the same as those in steps S1050 and S1060 according to the first embodiment, and a description thereof will not be repeated.

(Step S2070) Generation of Second Window Image Group of Common Size

In step S2070, the second window image acquisition unit 212 generates the second window image group by cutting out a plurality of subregions (windows) from the second image acquired from the second image acquisition unit 111. This processing is the same as that in step S2020. The size of the window area set in step S2070 is equal to that of the window area set in step S2020. In each window image included in the second window image group, the position vector of the kth pixel using the reference point (for example, window center position) as the origin can be given by $X_{W,k}$ ($1 \leq k \leq N_{PN}$). The number $N_{PN}$ of pixels of a window image included in the second window image group coincides with the number of pixels of a window image included in the first window image group.

However, the number of window images generated from the first image may be different from that of window images generated from the second image. Similar to step S2020, when the arrangement of pixels $X_{2,i}$ ($1 \leq i \leq N_2$) which form the second image is not spatially uniform, the first window image acquisition unit 202 uniforms the pixel arrangement using an interpolation method such as interpolation processing.

The second window image acquisition unit 212 records the window center position $X_{WC2,j}$ ($1 \leq j \leq N_{W2}$) and the intensity value $b_{W2,j,k}$ ($1 \leq j \leq N_{W2}$, $1 \leq k \leq N_{PN2}$) of the pixel for each second window image included in the second window image group. Since the position of a pixel in each window image is the same as $X_{W,k}$ ($1 \leq k \leq N_{PN}$) recorded in step S2020, recording of the pixel position can be omitted.

(Step S2080) Calculation of Feature Value of Second Window Image Group

In step S2080, the second feature value calculation unit 214 calculates the feature value of each window image included in the second window image group. More specifically, the second feature value calculation unit 214 calculates the feature value of each window image based on the intensity values of pixels which form the window image, and the information about the monomial matrix generated in step S2030.

For example, the second feature value calculation unit 214 can calculate the vector $c_{W,j}$ according to equation (8). More specifically, the second feature value calculation unit 214 solves equation (8) using the intensity value $b_{W2,j,k}$ ($1 \leq j \leq N_{W2}$, $1 \leq k \leq N_{PN}$) of each pixel of the window image recorded in step S2070, and $Q_W$ generated in step S2030. Then, the second feature value calculation unit 214 can calculate the feature value of the window image using the vector $c_{W1,j}$, similar to step S2040. The second feature value calculation unit 214 calculates and records the feature value vector $f_{W2,j}$ ($1 \leq j \leq N_{W2}$) for all the window images generated in step S2070.

Processes in steps S2090 to S2130 are the same as those in steps S1100 to S1140 according to the first embodiment, and a description thereof will not be repeated. In this fashion, the image processing apparatus 20 according to the second embodiment executes processing.

The image processing system according to the above-described embodiment uses a common monomial matrix in calculation of the feature value of a window image. The second embodiment need not repetitively generate information about the monomial matrix, and can reduce the processing load.

(Modification 2-1)

In the second embodiment, window images having the common size are generated from the first and second images. However, window images obtained from the first image and those obtained from the second image may have different sizes. Window images having one of a plurality of shapes may be generated from the first image (and the second image). For example, a window image obtained from the center of an image and one obtained from the periphery of the image may have different shapes.

The shape of a window image may be set in advance. Pieces of information M, Q, and R about the monomial matrix are determined in accordance with the shape of a window image and the origin in the window image. Therefore, when the shape of a window image is set in advance, the pieces of information M, Q, and R about the monomial matrix may also be determined in advance. In this case, processing in step S2030 in the second embodiment can be omitted. For example, when the pixel position of a window used in the image processing apparatus 20 is always fixed, information about a monomial matrix determined by the pixel position may be recorded in advance on a magnetic disk 813. In this case, the information about the monomial matrix recorded on the magnetic disk 813 is loaded in steps S2040 and S2080.

[Third Embodiment] (Correspondence Based on Independence of Window Image)

In the first embodiment, a feature value calculated for each window image included in the first window image group is used as an index, and a window image for which another window image similar to it by a predetermined threshold or more does not exist is selected as a characteristic window image. A similar window image included in the second window image group is made to correspond to each characteristic window image. However, the embodiment is not limited to this. In the third embodiment, the independence of each window image included in the first window image group is calculated based on a calculated feature value. Based on the independence, the first window image group and second window image group are made to correspond to each other.

FIG. 7 shows the arrangement of an image processing system according to the third embodiment. In FIG. 7, the same reference numerals as those in the image processing system of the first embodiment denote similar building components, and a description thereof will not be repeated.

An independence degree calculation unit 305 calculates the degree of independence based on the feature value calculated by a first feature value calculation unit 104 for each window image included in the first window image group. A correspondence calculation unit 315 calculates correspondence between window images based on a feature value calculated by the first feature value calculation unit 104, a feature value calculated by a second feature value calculation unit 114, and the degree of independence calculated by the independence degree calculation unit 305.

Figure 8:
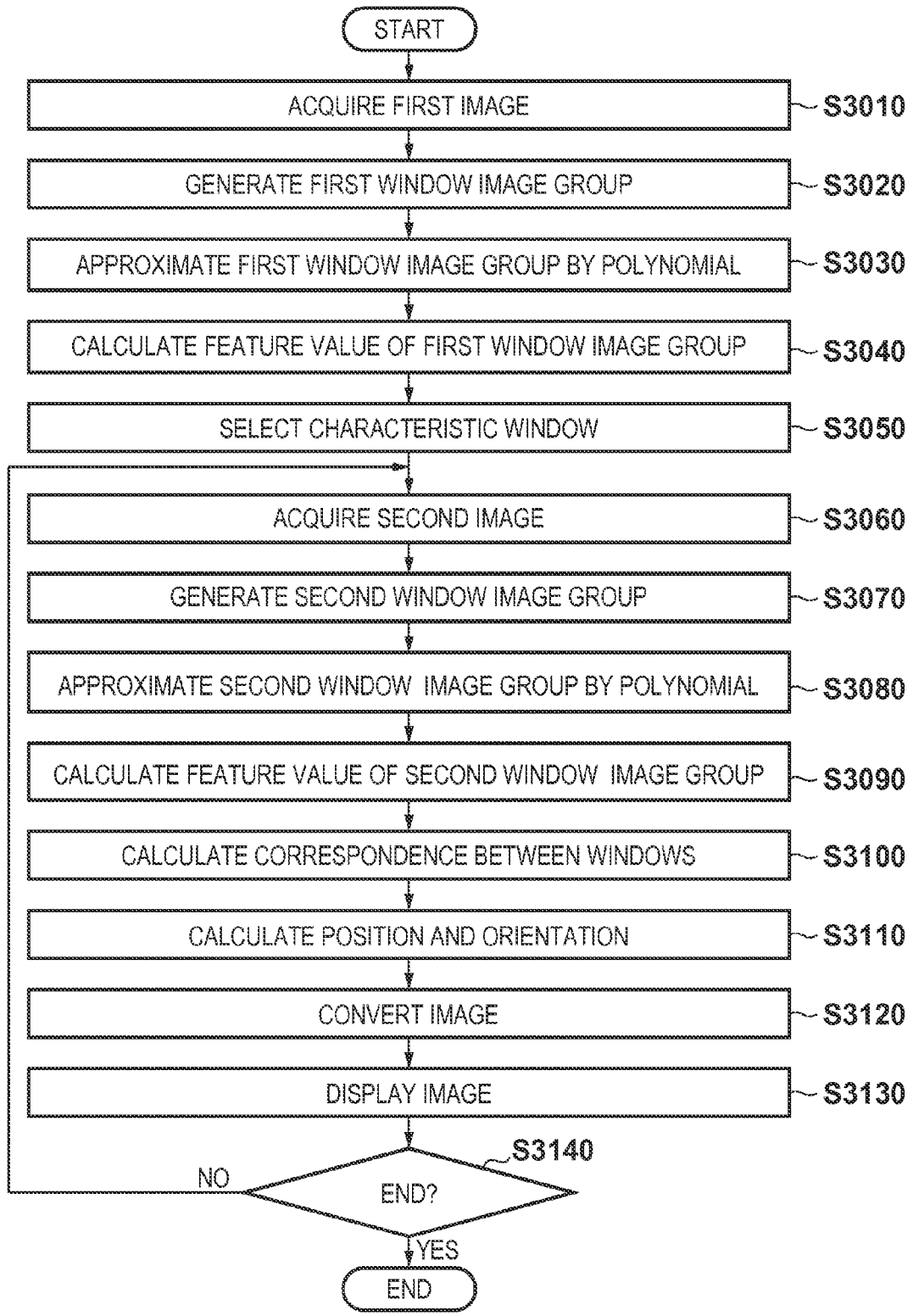
FIG. 8 is a flowchart showing a processing sequence by an image processing apparatus 30 according to the third embodiment.

An operation to be performed by an image processing apparatus 30 according to the third embodiment will be described in detail with reference to the flowchart of FIG. 8. Processes in steps S3010 to S3040 are the same as those in steps S1010 to S1040 according to the first embodiment, and a description thereof will not be repeated.

(Step S3050) Calculation of Degree of Independence

In step S3050, the independence degree calculation unit 305 calculates the degree $g_j$ ($1 \leq j \leq N_{W1}$) of independence of a window image included in the first window image group. $g_j$ represents the degree of independence of the jth window image. More specifically, the degree of independence is calculated based on the feature value $f_{W1,j}$ ($1 \leq j \leq N_{W1}$) of a window image. For example, the independence degree calculation unit 305 can calculate the degree of independence according to equation (10):

$$g_j = \min_{1 \leq i \leq N_{W1}, i \neq j} (\|f_{W1,j} - f_{W1,i}\|_{L1}) \quad (10)$$

wherein $i \leq j \leq N_{W1}$ where $\|f_{W1,j} - f_{W1,i}\|_{L1}$ is the $L_1$ norm of a vector $(f_{W1,j} - f_{W1,i})$. According to equation (10), when a window image having a similar feature value vector f exists, the degree $g_j$ of independence of the jth window image decreases. To the contrary, when a window image having a similar feature value vector f does not exist, the degree $g_j$ of independence of the jth window image increases. That is, a higher degree $g_j$ of independence represents that the jth window image is more independent from other window images. A higher degree of independence means that there are few similar window images which may cause erroneous correspondence. The independence degree calculation unit 305 records the calculated degree $g_j$ ($1 \leq j \leq N_{W1}$) of independence.

Processes in steps S3060 to S3090 are the same as those in steps S1060 to S1090 according to the first embodiment, and a description thereof will not be repeated.

(Step S3100) Correspondence Between Windows Considering Degree of Independence

In step S3100, the correspondence calculation unit 315 makes the first window image group and second window image group correspond to each other based on the feature value and the degree of independence for the first window image group, and the feature value for the second window image group. More specifically, the correspondence calculation unit 315 executes the following processing. First, the correspondence calculation unit 315 searches feature value vectors $f_{W2,j}$ ($1 \leq j \leq N_{W2}$) for a feature value vector most similar to each feature value vector $f_{W1,k}$ ($1 \leq k \leq N_{W1}$) based on a predetermined criterion. For example, when the $L_1$ norm of the difference vector between two feature value vectors is smaller, it can be determined that these two feature value vectors are more similar. This processing can be performed similarly to step S1100.

Further, the correspondence calculation unit 315 determines whether the difference between similar feature values is larger than the degree of independence. If the difference between feature values is equal to or smaller than the degree of independence, the correspondence calculation unit 315 does not make the two feature value vectors correspond to each other. If the difference between feature values is larger than the degree of independence, the correspondence calculation unit 315 makes the two feature value vectors correspond to each other.

Processing will be exemplified for a case in which the feature value vector of the jth window image included in the first window image group is similar to the feature value vector of the kth window image included in the second window image group. At this time, the correspondence calculation unit 315 calculates the $L_1$ norm of the difference vector between feature value vectors $f_{W1,j}$ and $f_{W2,k}$. When the $L_1$ norm is equal to or smaller than the degree $g_j$ ($1 \leq j \leq N_{W1}$) of independence, the correspondence calculation unit 315 makes the jth window image included in the first window image group correspond to the kth window image included in the second window image group. If the $L_1$ norm exceeds the degree $g_j$ ($1 \leq j \leq N_{W1}$) of independence, the correspondence calculation unit 315 does not make these window images correspond to each other. To optimize the operation, the degree $g_j$ of independence may be multiplied by a predetermined coefficient.

The correspondence calculation unit 315 records the obtained correspondence. More specifically, the correspondence calculation unit 315 records a pair of the feature value vector $f_{W1S,k}$ ($1 \leq k \leq N_{W1S}$) and the corresponding feature value vector $f_{W2S,k}$ ($1 \leq k \leq N_{W1S}$). Also, the correspondence calculation unit 315 records pairs of the center position $X_{WC1S,k}$ ($1 \leq k \leq N_{W1S}$) of the window and the center position $X_{WC2S,k}$ ($1 \leq k \leq N_{W1S}$) of the corresponding window.

When the $L_1$ norm exceeds the degree $g_j$ ($1 \leq j \leq N_{W1}$) of independence, the correspondence calculation unit 315 may record correspondence between window images together with information representing that the degree of independence is excessively low. In this case, in subsequent step S3110, an image generation unit 116 can ignore correspondence having the information representing that the degree of independence is excessively low.

Processes in steps S3110 to S3140 are the same as those in steps S1110 to S1140 according to the first embodiment, and a description thereof will not be repeated.

In the third embodiment, the degree of independence of the first window image is calculated. However, the degree of independence of the second window image may be calculated and used to determine whether to establish correspondence. Alternatively, the degrees of independence of both the first and second images may be calculated and used to determine whether to establish correspondence. For example, the sum of the degree of independence of the first window image and that of independence of the second window image may be used instead of the degree of independence of the first window image.

The image processing system according to the above-described embodiment calculates the degree of independence of each window image included in the first window image group. By referring to the degree of independence, the image processing system switches whether to establish correspondence. Thus, correspondence is rarely established for a window image having a low degree of independence. In contrast, correspondence is actively established for a window image having a high degree of independence. As a result, window images can be adaptively made to correspond to each other in consideration of self-similarity within the image. Since unrelated window images are hardly made to correspond to each other, it is expected to obtain a more accurate alignment result.

[Fourth Embodiment] Deformation of Window Image

In the first embodiment, a plurality of window centers are arranged in the image areas of the first and second images.

Then, spherical subregions (windows) are set using the respective window centers as their centers. A window image group is generated by cutting out images in the set windows. The first embodiment is more effective when a spherical area in the first image corresponds to a spherical area in the second embodiment. That is, the first embodiment is more effective when the subject hardly deforms between the first and second images. However, the subject sometimes deforms between the first and second images. In the fourth embodiment, a window area set in the first image and a window area set in the second image have different shapes. According to the fourth embodiment, even when the subject deforms between the first and second images, images can be made to correspond to each other at higher accuracy.

FIG. 9 shows the arrangement of an image processing system according to the fourth embodiment. In FIG. 9, the same reference numerals as those in the image processing system of the first embodiment denote common building components, and a description thereof will not be repeated.

A first window image acquisition unit 402 generates the first window image group by cutting out a plurality of subregions (windows) from the first image acquired from a first image acquisition unit 101. The shape of the window area is not always a sphere. For example, the shape of the window area may be an ellipse obtained by flattening a sphere variously.

Figure 10:
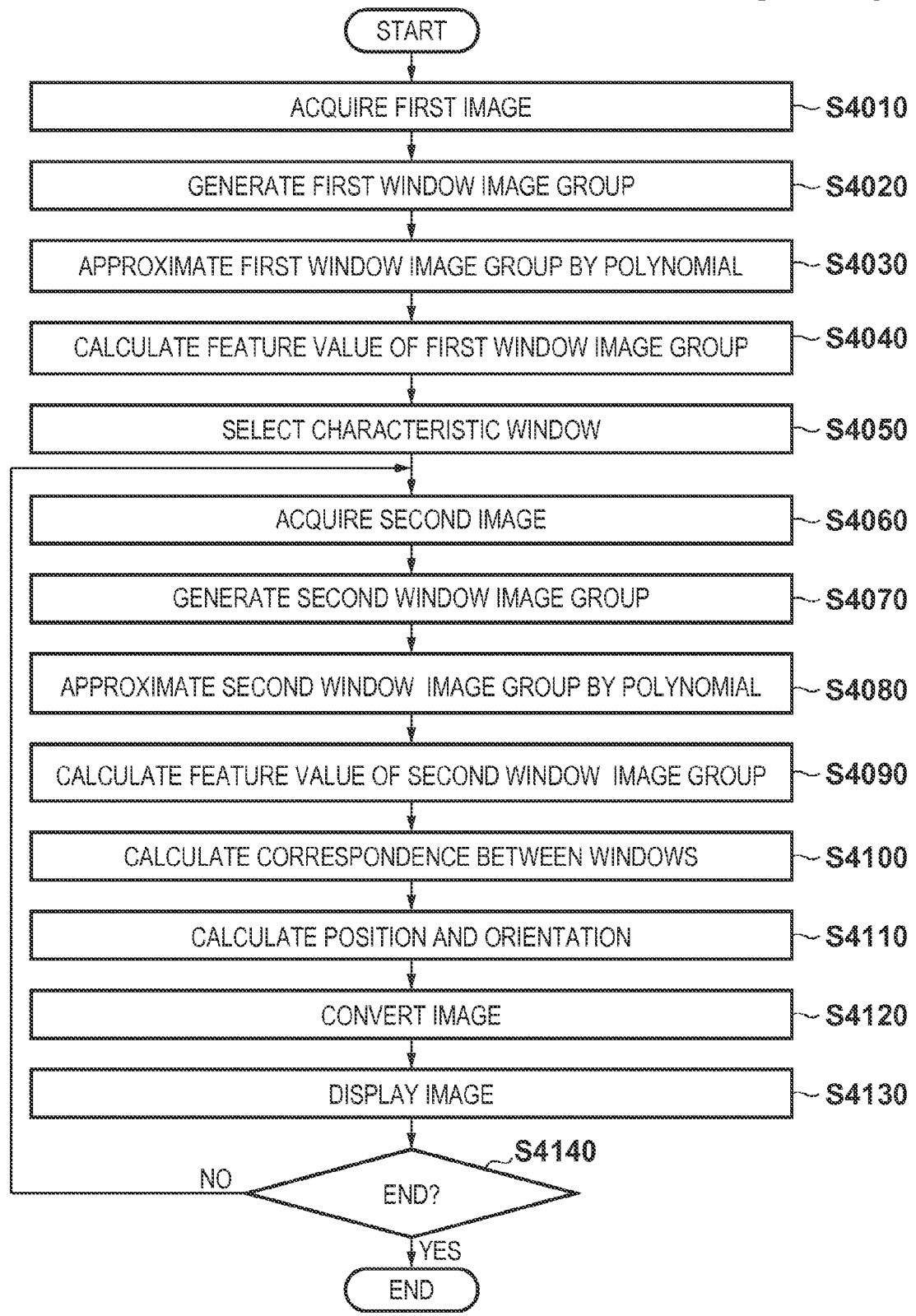
FIG. 10 is a flowchart showing a processing sequence by an image processing apparatus 40 according to the fourth embodiment.

An operation to be performed by an image processing apparatus 40 according to the fourth embodiment will be described in detail with reference to the flowchart of FIG. 10. Processing in step S4010 is the same as that in step S1010 according to the first embodiment, and a description thereof will not be repeated.

(Step S4020) Generation of Various Elliptic Window Images

In step S4020, the first window image acquisition unit 402 generates the first window image group by cutting out a plurality of subregions (windows) from the first image acquired from the first image acquisition unit 101. The shapes of window images cut out from the first image by the first window image acquisition unit 402 in step S4020 will be explained with reference to FIGS. 11A to 11I.

FIG. 11A exemplifies a window area set in the first image by the first window image acquisition unit 402. A window area 910 shown in FIG. 11A is a spherical area using a window center 911 as its center. However, the window area set by the first window image acquisition unit 402 in the fourth embodiment is not limited to one shown in FIG. 11A. For example, the first window image acquisition unit 402 may set window areas of shapes shown in FIGS. 11B to 11I. Shapes shown in FIGS. 11B and 11C are shapes (ellipses) obtained by flattening a spherical window in a given axial direction. Shapes shown in FIGS. 11D and 11E are ellipses obtained by flattening a spherical window in an axial direction different from that in FIGS. 11B and 11C. The direction in which a sphere is flattened is not limited to a coordinate axis direction in the reference coordinate system of the first image. For example, shapes shown in FIGS. 11F to 11I are obtained by flattening a spherical window in arbitrary directions. The window shape is not always an ellipse. For example, the window shape can be an arbitrary shape generated by deforming a spherical shape.

In this step, the first window image acquisition unit 402 generates the first window image group by cutting out window images of various shapes from the first image. For example, the first window image acquisition unit 402 sets $N_{W1center}$ window center positions at equal intervals in the entire area of the first image. Then, the first window image acquisition unit 402 sets $N_{angle}$ types of elliptic areas using these positions as their centers. Elliptic areas of respective types can be elliptic shapes obtained by flattening a sphere in different directions. By cutting out window images in accordance with the set window areas, the first window image acquisition unit 402 generates a total of $N_{W1center} \times N_{angle}$ window images.

For each window image included in the first window image group, the first window image acquisition unit 402 records the window center position, and a pair of the position and intensity value of a pixel included in the window. In this case, $X_{WC1,j}$ ($1 \le j \le N_{W1}$) represents the window center position of the jth window image. $X_{W1,j,k}$ ($1 \le j \le N_{W1}$, $1 \le k \le N_{PN1,j}$) represents the position of the kth pixel in the jth window image. $b_{W1,j,k}$ ($1 \le j \le N_{W1}$, $1 \le k \le N_{PN1,j}$) represents the intensity value of the kth pixel in the jth window image. $N_{W1}$ is the number of window images included in the first window image group, and $N_{W1} = N_{W1center} \times N_{angle}$ in the embodiment.

At this time, the first window image acquisition unit 402 may correct the pixel position $X_{W1,j,k}$. For example, the first window image acquisition unit 402 can correct a window image included in the first window image group to have the same shape as that of a window image included in the second window image group. In the embodiment, the second window image group has a spherical shape. By correcting the pixel position $X_{W1,j,k}$, the first window image acquisition unit 402 can correct the first window image group to have a spherical shape. A case in which a window image generated from a window area flattened to halve the length along the x-axis is corrected will be examined. Assume that the origin of the coordinate system in the window image is the center of the window image. In this case, the first window image acquisition unit 402 suffices to double the x-coordinate of the position of a pixel included in the window image. By correcting the shape of a window image in this way, even when the subject deforms between the first and second images, the images can be aligned at higher accuracy.

Processes in steps S4030 to S4140 are the same as those in steps S1030 to S1140 according to the first embodiment, and a description thereof will not be repeated.

The image processing system according to the above-described embodiment generates, as the first window image group, window images of shapes obtained by flattening a sphere variously. Then, the image processing system calculates the feature values of these window images. According to the fourth embodiment, even when the subject of the first image deforms in the second image, alignment can be performed at higher accuracy.

(Modification 4-1) Change of Window Shape in Accordance with Subject Deformation Amount In the fourth embodiment, a predetermined number of window areas are set at the respective center positions of window areas in step S4020. However, the embodiment is not limited to this. For example, when the deformation characteristic of a subject is given in advance, the shape of a window area can be determined in accordance with the deformation characteristic. Also, when the deformation characteristic of a subject can be estimated, the shape of a window area can be determined in accordance with the deformation characteristic.

For example, when the subject is contracted or expanded in a predetermined direction in an image, a window area flattened in this direction may be set. The flattening amount of a window area may be determined depending on the degree of contraction or expansion. When the deformation amount can be estimated or acquired for each region in an image, a window area of a different shape may be set for each region in the image based on the deformation amount. It is also possible not to generate a window image from a portion where it can be estimated that the subject greatly deforms.

This method can determine the shape of a window image in accordance with the deformation amount of a subject between the first and second images. By using a generated window image, alignment can be performed more accurately.

[Other Embodiments]

Note that the description in the above embodiments is merely an example of a suitable image processing apparatus according to the present invention, and the present invention is not limited to this. For example, in each embodiment described above, each building component may be divided into a plurality of building components. One building component may implement the functions of a plurality of building components. In the above-described embodiments, building components for processing the first image, and those for processing the second image are different. For example, in the first embodiment, the building components 101 to 104 calculate a feature value from the first image, and the building components 111 to 114 calculate a feature value from the second image. However, the building components 101 to 104 may calculate a feature value from the second image.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-213381, filed Sep. 28, 2011 which is hereby incorporated by reference herein in its entirety.

The invention claimed is:

1. An image processing apparatus comprising a processor coupled to a memory for executing the steps of:
    obtaining an image;
    calculating a set of numerical values formed from degrees of contribution to an accuracy of approximation of the image using an approximation polynomial, wherein the approximation polynomial provides an approximation relationship between a pixel position of the image and an intensity value at the pixel position and is formed from a plurality of monomials, and wherein the degree of contribution is calculated for each order by integrating the degree of contribution of same order monomials in the approximation polynomial to the accuracy of approximation of the image using the approximation polynomial; and
    outputting the set of the calculated numerical values as a feature value of the image.

2. The apparatus according to claim 1, wherein the processor further executes the steps of:
    obtaining a first image and a second image;
    setting a group of first subregions in an image area of the first image;
    extracting, as a group of first partial images, images included in the respective first subregions from the first image;
    setting a group of second subregions in an image area of the second image;
    extracting, as a group of second partial images, images included in the respective second subregions from the second image;
    acquiring a feature value which has been calculated for each first partial image and output, acquiring a feature value which has been calculated for each second partial image and output, seletting, from the group of second partial images for each first partial image, a second partial image for which a feature value most similar to the feature value of the first partial image has been calculated, and making the second partial image correspond to the first partial image of interest;
    aligning the first image and the second image so that each pair of a first subregion and a second subregion come close to each other, wherein the first partial image is extracted from the first subregion, the second partial image is extracted from the second subregion, and the first partial image and the second partial image have been made to correspond to each other; and
    outputting the first image and the second image which have been aligned.

3. The apparatus according to claim 2, wherein the processor further executes the steps of:
    determining whether a minimum value of a difference between the feature value of the first partial image of interest included in the group of first partial images and the feature value of a partial image included in the group of first partial images other than the first partial image of interest is not smaller than a predetermined threshold, and
    when the minimum value is determined to be not smaller than the predetermined threshold, making the second partial image correspond to the first partial image of interest.

4. The image processing apparatus according to claim 1, wherein the degree of contribution corresponding to an order of interest is a sum of squares of degrees of contribution of monomials having the order of interest, each degree of contribution indicates contribution of the monomial to the accuracy of approximation of the image using the approximation polynomial.

5. The image processing apparatus according to claim 1, wherein the degree of contribution of a monomial to the accuracy of approximation of the image using the approximation polynomial corresponds to a coordinate value corresponding to the monomial, wherein the coordinate value is defined by projection of the intensity value into an orthogonal space, wherein the orthogonal space is defined by bases which respectively correspond to the plurality of monomials.

6. The image processing apparatus according to claim 1, wherein the degree of contribution $f_p$ is calculated for each order p by integrating the degrees of contribution $c_{lmn}$ of monomials having the same order p using the following formula:

$$f_p = \sum_{0 \leq l, 0 \leq m, 0 \leq n, l+m+n=p} c_{lmn}^2;$$

wherein $c_{lmn}$ is a contribution of a monomial $x^l y^m z^n$ in the approximation polynomial to the accuracy of approximation of the image using the approximation polynomial.

7. An image processing apparatus comprising a processor coupled to a memory for executing the steps of:

obtaining an image;

acquiring orthogonal vectors corresponding to respective monomials for an approximation polynomial, wherein the approximation polynomial is formed from a plurality of monomials each having an order out of a plurality of orders and wherein the approximation polynomial provides a pixel value at a pixel position of the image as a function of the pixel position;

calculating feature values corresponding to the respective monomials by multiplication of a matrix having the orthogonal vectors as elements and a matrix having pixel values in the image as elements;

calculating a feature value corresponding to an order of interest by integrating the feature values corresponding to same order monomials having the order of interest; and outputting a set of the feature values corresponding to the respective orders as a feature value of the image.

8. The apparatus according to claim 7, wherein the image is a three-dimensional image, and the orthogonal vector is a row vector included in an orthogonal matrix Q obtained by QR-decomposing a matrix M:

$$M = \begin{pmatrix} m(x_1, y_1, z_1)^T \\ \vdots \\ m(x_N, y_N, z_N)^T \end{pmatrix}$$

the processor further executing the steps of:

calculating a value $c_{lmn}$ as the feature value corresponding to a monomial including $x^l y^m z^n$ according to an equation:

$$Q^T b = Q^T \begin{pmatrix} b_1 \\ \vdots \\ b_N \end{pmatrix} = \begin{pmatrix} c_{000} \\ c_{100} \\ c_{010} \\ c_{001} \\ c_{200} \\ \vdots \\ c_{00N_{degree}} \end{pmatrix}$$

and calculating a value $f_p$ as the feature value corresponding to an order p according to an equation:

$$f_p = \sum_{0 \leq l, 0 \leq m, 0 \leq n, l+m+n=p} c_{lmn}^2$$

wherein the image includes N pixels, a coordinate value of the kth pixel out of the N pixels is $(x_k, y_k, z_k)$, a pixel value of the kth pixel is $b_k$, a column vector $m(x_k, y_k, z_k)$ includes a component $x_k^l y_k^m z_k^n$ ($l+m+n \leq N_{degree}$; l, m, and n are integers of not smaller than 0), and $N_{degree}$ is an order of the approximation polynomial.

9. An image processing apparatus comprising a processor coupled to a memory for executing the steps of:

obtaining an image;

acquiring, for an approximation polynomial, first information representing values of respective elements of a first matrix which has orthogonal vectors corresponding to respective monomials as elements and second information which represents values of respective elements of a second matrix, wherein the approximation polynomial is formed from a plurality of monomials each having an order out of a plurality of orders and provides a pixel value at a pixel position of the image as a function of the pixel position, and wherein multiplication of the first matrix and the second matrix provides a matrix having products of coordinate values of pixel positions in the image as elements;

calculating coefficients of the respective monomials from the first matrix, the second matrix, and a matrix having pixel values at the respective pixel positions in the image as elements, and calculating feature values corresponding to the respective monomials by multiplication of the second matrix and a matrix having the coefficients of the respective monomials as elements;

calculating a feature value corresponding to an order of interest by integrating the feature values corresponding to same order monomials having the order of interest; and outputting a set of the feature values corresponding to the respective orders as a feature value of the image.

10. The apparatus according to claim 9, wherein the image is a three-dimensional image, the matrix having products of coordinate values of pixel positions in the image as elements is a matrix M:

$$M = \begin{pmatrix} m(x_1, y_1, z_1)^T \\ \vdots \\ m(x_N, y_N, z_N)^T \end{pmatrix}$$

and the first matrix is an orthogonal matrix Q and the second matrix is a matrix R, wherein QR-decomposition of the matrix M provides the matrixes Q and R, the processor further executing the steps of:

calculating a coefficient $a_{lmn}$ of a monomial including $x^l y^m z^n$ according to an equation:

$$R \begin{pmatrix} a_{000} \\ a_{100} \\ a_{010} \\ a_{001} \\ a_{200} \\ \vdots \\ a_{00N_{degree}} \end{pmatrix} = Q^T b$$

calculating a value $c_{lmn}$ as the feature value corresponding to the monomial including $x^l y^m z^n$ according to an equation:

$$R\begin{pmatrix} a_{000} \\ a_{100} \\ a_{010} \\ a_{001} \\ a_{200} \\ \vdots \\ a_{00N_{degree}} \end{pmatrix} = \begin{pmatrix} c_{000} \\ c_{100} \\ c_{010} \\ c_{001} \\ c_{200} \\ \vdots \\ c_{00N_{degree}} \end{pmatrix}$$

and calculating a value $f_p$ as the feature value corresponding to an order p according to an equation:

$$f_p = \sum_{0 \leq l, 0 \leq m, 0 \leq n, l+m+n=p} c_{lmn}^2$$

wherein the image includes N pixels, a coordinate value of the kth pixel out of the N pixels is $(x_k, y_k, z_k)$, a pixel value of the kth pixel is $b_k$, a column vector $m(x_k, y_k, z_k$ includes a component $x_k^l y_k^m z_k^n (l+m+n \leq N_{degree}$; l, m, and n are integers of not smaller than 0), and $N_{degree}$ is an order of the approximation polynomial.

11. An image processing apparatus comprising:
first obtaining means for obtaining an image;
calculation means for calculating a set of numerical values formed from degrees of contribution to an accuracy of approximation of the image using an approximation polynomial, wherein the approximation polynomial provides an approximation relationship between a pixel position of the image and an intensity value at the pixel position and is formed from a plurality of monomials, and wherein the degree of contribution is calculated for each order by integrating the degree of contribution of same order monomials in the approximation polynomial to the accuracy of approximation of the image using the approximation polynomial; and
first output means for outputting the set of the calculated numerical values as the feature value of the image.

12. An image processing method comprising:
obtaining an image;
calculating a set of numerical values formed from degrees of contribution to an accuracy of approximation of the image using an approximation polynomial, wherein the approximation polynomial provides an approximation relationship between a pixel position of the image and an intensity value at the pixel position and is formed from a plurality of monomials, and wherein the degree of contribution is calculated for each order by integrating the degree of contribution of same order monomials in the approximation polynomial to the accuracy of approximation of the image using the approximation polynomial; and
outputting the set of the calculated numerical values as a feature value of the image.

13. A non-transitory computer-readable medium storing a computer program for causing a computer to:
obtain an image;
calculate a set of numerical values formed from degrees of contribution to an accuracy of approximation of the image using an approximation polynomial, wherein the approximation polynomial provides an approximation relationship between a pixel position of the image and an intensity value at the pixel position and is formed from a plurality of monomials, and wherein the degree of contribution is calculated for each order by integrating the degree of contribution of same order monomials in the approximation polynomial to the accuracy of approximation of the image using the approximation polynomial; and
output the set of the calculated numerical values as a feature value of the image.

14. An image processing apparatus comprising a processor coupled to a memory for executing the steps of:
obtaining an image;
calculating a set of numerical values formed from degrees of contribution to an accuracy of approximation of the image using an approximation polynomial, wherein the approximation polynomial provides an approximation relationship between a pixel position of the image and an intensity value at the pixel position and is formed from a plurality of monomials, and wherein the degree of contribution is calculated for each order by integrating the degree of contribution of same order monomials in the approximation polynomial to the accuracy of approximation of the image using the approximation polynomial, the degrees of contribution relating to an approximation error resulting from respective orders of the approximation polynomial; and
outputting the set of the calculated numerical values as a feature value of the image.

15. An image processing method comprising:
obtaining an image;
calculating a set of numerical values formed from degrees of contribution to an accuracy of approximation of the image using an approximation polynomial, wherein the approximation polynomial provides an approximation relationship between a pixel position of the image and an intensity value at the pixel position and is formed from a plurality of monomials, and wherein the degree of contribution is calculated for each order by integrating the degree of contribution of same order monomials in the approximation polynomial to the accuracy of approximation of the image using the approximation polynomial, the degrees of contribution relating to an approximation error resulting from respective orders of the approximation polynomial; and
outputting the set of the calculated numerical values as a feature value of the image.

16. A non-transitory computer-readable medium storing a computer program for causing a computer to:
obtain an image;
calculate a set of numerical values formed from degrees of contribution to an accuracy of approximation of the image using an approximation polynomial, wherein the approximation polynomial provides an approximation relationship between a pixel position of the image and an intensity value at the pixel position and is formed from a plurality of monomials, and wherein the degree of contribution is calculated for each order by integrating the degree of contribution of same order monomials in the approximation polynomial to the accuracy of approximation of the image using the approximation polynomial, the degrees of contribution relating to an approximation error resulting from respective orders of the approximation polynomial; and
output the set of the calculated numerical values as a feature value of the image.

17. An image processing apparatus comprising a processor coupled to a memory for executing the steps of:
obtaining an image;
calculating a set of numerical values formed from degrees of contribution, wherein an approximation polynomial provides an approximation relationship between a pixel position of the image and an intensity value at the pixel position and is formed from a plurality of monomials each having an order out of a plurality of orders, and wherein each of the degrees of contribution is contribution of a monomial, for each order of the approximation polynomial, to an accuracy of approximation of the image using the approximation polynomial; and
outputting the set of the calculated numerical values as a feature value of the image.

* * * * *